United States Patent
Taubert

(10) Patent No.: US 8,760,071 B2
(45) Date of Patent: Jun. 24, 2014

(54) DRIVE CIRCUIT FOR LIGHT EMITTING DIODE ARRAY BASED ON A BUCK-BOOST TOPOLOGY

(75) Inventor: Timothy A. Taubert, Kirtland, OH (US)

(73) Assignee: ABL IP Holding LLC, Conyers, GA (US)

( * ) Notice: Subject to any disclaimer, the term of this patent is extended or adjusted under 35 U.S.C. 154(b) by 752 days.

(21) Appl. No.: 12/915,851

(22) Filed: Oct. 29, 2010

(65) Prior Publication Data

US 2012/0104966 A1 May 3, 2012

(51) Int. Cl.
  *H05B 41/24* (2006.01)
(52) U.S. Cl.
  CPC ........................................ *H05B 41/24* (2013.01)
  USPC ............ 315/247; 315/291; 315/294; 315/297
(58) Field of Classification Search
  CPC ...................................................... H05B 41/36
  USPC ................... 315/247, 291, 294, 297, 307, 312
  See application file for complete search history.

(56) References Cited

U.S. PATENT DOCUMENTS

| | | | |
|---|---|---|---|
| 5,235,504 A | 8/1993 | Sood | |
| 5,615,101 A | 3/1997 | Moriarty | |
| 5,635,800 A | 6/1997 | Taubert | |
| 5,734,562 A | 3/1998 | Redl | |
| 8,076,920 B1 | 12/2011 | Melanson | |
| 8,164,275 B2* | 4/2012 | Doudousakis et al. | ....... 315/291 |
| 2005/0218870 A1 | 10/2005 | Lys | |
| 2006/0132061 A1 | 6/2006 | McCormick | |
| 2007/0040516 A1* | 2/2007 | Chen | .............................. 315/291 |
| 2007/0188114 A1 | 8/2007 | Lys | |
| 2012/0104966 A1* | 5/2012 | Taubert | .......................... 315/291 |
| 2012/0104972 A1 | 5/2012 | Taubert | |

OTHER PUBLICATIONS

Tseng, Ching-Jung, "A Passive Lossless Snubber Cell for Nonisolated PWM DC/DC Converters", IEEE Transactions on Industrial Electronics, vol. 45, No. 4, Aug. 1998, pp. 593-601.
Ben-Yaakov, Sam, "Benefits of Silicon Carbide Schottky Diodes in Boost APFC Operating in CCM", Power Electronics Laboratory, Dept. of Electrical and Computer Engineering, 2001.
Non Final Office Action for U.S. Appl. No. 12/915,685, mailed Jun. 12, 2013, 17 pages.
Final Office Action for U.S. Appl. No. 12/915,685, mailed Nov. 13, 2013, 19 pages.

* cited by examiner

*Primary Examiner* — Douglas W Owens
*Assistant Examiner* — Borna Alaeddini
(74) *Attorney, Agent, or Firm* — Kilpatrick Townsend & Stockton, LLP

(57) ABSTRACT

Features of the invention are related to drive circuits that provide both power factor correction and voltage conversion in a single circuit and in some implementations drive an LED array. This single stage converter uses a buck-boost topology and can operate LED arrays that have DC voltages above or below the AC line voltage. An output side filter and bulk energy storage device is placed at the output of the circuit. Bulk energy storage can be provided by an inductor, a capacitor, or a combination of an inductor and a capacitor. The output side filtering can be provided by a capacitor or a capacitor and an inductor. The circuit also includes a switch and a switch control device for controlling the switch to provide power factor correction.

13 Claims, 22 Drawing Sheets

US 8,760,071 B2

DRIVE CIRCUIT FOR LIGHT EMITTING DIODE ARRAY BASED ON A BUCK-BOOST TOPOLOGY

RELATED APPLICATION

This application is related to U.S. Ser. No. 12/915,685, entitled Drive Circuit for Light Emitting Diode Array Based on SEPIC or CUK Topology, filed Oct. 29, 2010, the entirety of which is incorporated by reference.

FIELD OF THE INVENTION

The present invention is related to power circuits, and more particularly to drive circuits, such as those used with light emitting diodes.

BACKGROUND OF THE INVENTION

Light emitting diodes (LEDs), including LED arrays, are commonly used for lighting applications. Some applications are powered by an AC power source and require multiple circuits to transform the AC input to an approximately constant current or an approximately constant voltage to power the LEDs. Each of the circuits typically performs a single function. For example, some applications use a power factor correction circuit that feeds a bulk energy storage device and a separate power conversion circuit. The use of separate circuits requires a relatively large number of components, which affects the cost of the system. The bulk energy storage device is typically an electrolytic capacitor. One disadvantage of using an electrolytic capacitor in these types of applications is that the electrolytic capacitor is relatively expensive and has a relatively short life. In addition, the electrolytic capacitor is typically the component with the lowest reliability in the ballast and drive circuits. It would reduce the cost and increase the reliability of LED drive circuits if the number of components needed to drive the LEDs could be reduced and if those components could be ones that are less costly and more reliable.

SUMMARY

Aspects of the invention provide drive circuits that provide both power factor correction and voltage conversion in a single stage circuit having fewer and more reliable components than existing circuits. These circuits place the bulk energy storage device at the output of the single stage circuit.

One drive circuit includes a first load connection point and a second load connection point for connecting a load, such as an LED array, to an output of the circuit. The output side filter and bulk energy storage device is connected to the first load connection point and to the second load connection point and to the cathode of a free wheeling diode. The bulk energy storage device stores energy from one power line cycle to the next power line cycle. In some circuits the bulk energy storage device is an inductor, in other circuits the bulk energy storage device is a capacitor, while in yet other circuits the bulk energy storage device is a combined device that uses both a capacitor and an inductor. The output side filter provides additional converter frequency ripple filtering to that provided by the bulk energy storage device. Those circuits that use an inductor as the bulk energy storage device also include a capacitor connected between the first load connection point and the inductor to provide additional output side filtering. Those circuits that use a capacitor as the bulk energy storage device may also include an inductor connected to the cathode of the free wheeling diode and to the first load connection point to provide additional output side filtering. In those circuits that use a combination of a capacitor and an inductor as the storage device, the capacitor and the inductor also provide output side filtering.

The cathode of the free wheeling diode is connected to the output side filter and bulk energy storage device and the anode of the diode is connected to a switch. In some circuits, the switch is a MOSFET, but any other suitable switch can be used. A control device controls the switch to provide power factor correction of the input of the drive circuit using any one of several known control modes, such as a control mode where the on-time of the switch is inversely proportional to the input voltage to the circuit when the converter frequency is held constant. The drive circuit may also include other components, including an input filter and another inductor. The drive circuit provides both power factor correction and load regulation in a single stage.

The drive circuit may be used with an LED array. The circuit includes a first LED connection point and a second LED connection point for connecting the LED array to the output of the circuit. In some of these circuits, the bulk energy storage device is an inductor and the output side filtering is provided by the inductor and an output side capacitor. The inductor is connected to the second LED connection point and to the output side capacitor and the cathode of a free wheeling diode. The output side capacitor is connected to the first LED connection point and to the inductor and the cathode of the free wheeling diode. The free wheeling diode is connected via its anode to a switch. The switch may also be connected to an optional current sensing resistor. A control device controls the switch to provide power factor correction so that the circuit provides both power factor correction and voltage conversion.

In another circuit, the circuit includes a first LED connection point and a second LED connection point for connecting an LED array to an output of the circuit and a capacitor as the bulk energy storage device. The capacitor also provides output side filtering. In this circuit, there may also be an optional inductor to provide additional output side filtering. If there is no inductor, then the capacitor is connected between the first LED connection point and the second LED connection point. If the inductor is present, then the capacitor is connected to the first LED connection point and to the inductor and the cathode of a free wheeling diode. The circuit further includes a switch, a control device for controlling the switch and an optional current sensing resistor. The circuit provides both power factor correction and load regulation in a single circuit stage.

In at least one of the circuits, the control device controls the switch based on inputs corresponding to current detected by a current sense device, the current through a current sense resistor, and/or the output voltage.

Other features, advantages, and objects of the present invention will be apparent to those skilled in the art with reference to the remaining text and drawings of this application.

DETAILED DESCRIPTION

Circuits implementing the present invention provide a single stage circuit that provides both power factor correction (PFC) and power conversion to drive a load, such as an LED array. In some circuits, the output of the circuit provides approximately constant current for a range of input voltages, while in other circuits, the output of the circuit provides approximately constant voltage. The circuit uses an energy storage device at its output to provide PFC. One advantage of embodiments of the invention over the prior art is that they can be implemented using a circuit with fewer components where the components allow for lower cost, higher reliability and longer life. The circuit can utilize a buck-boost, SEPIC or Cuk topology.

Figure 1:
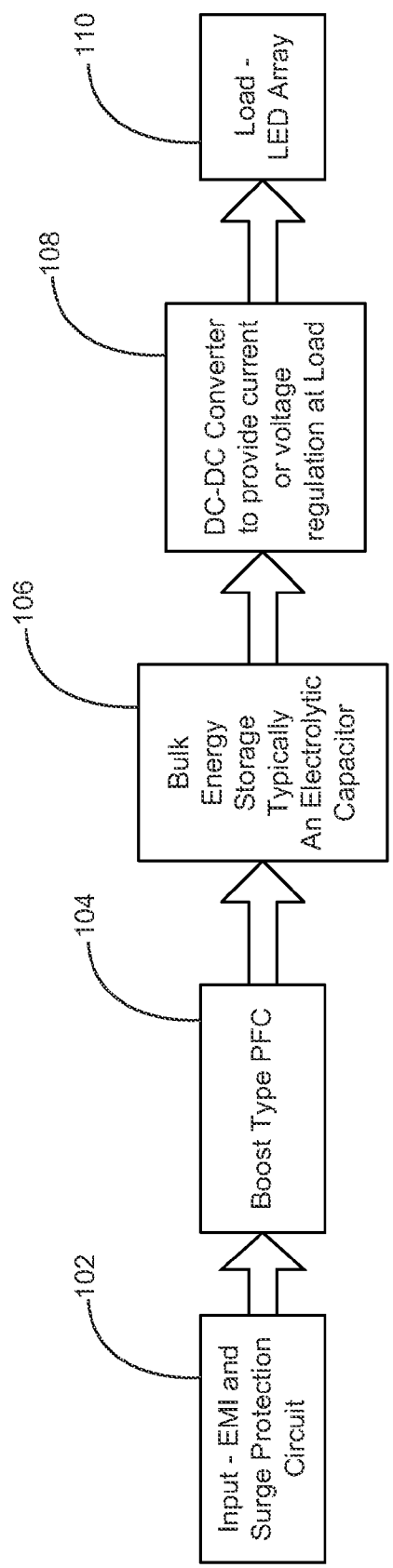
FIG. 1 is a block diagram of a prior art LED driver circuit.

FIG. 1 illustrates a block diagram for a prior art system that drives an LED array. The input of the system connects to a AC voltage source (not shown). Block 102 provides EMI filtering and surge protection. The output of block 102 is connected to block 104, which performs power factor correction (PFC). FIG. 1 illustrates a boost type PFC circuit. There are a number of commercially available control ICs that provide PFC control that can be used in block 104. The output of the PFC circuit 104 is connected to a bulk energy storage device 106. The bulk energy storage device is typically an electrolytic capacitor. The bulk energy storage device is connected to a DC-to-DC converter 108. The DC-to-DC converter provides current or voltage regulation at the load, which in FIG. 1 is an LED array 110. Block 108 also provides isolation if needed. Block 108 is typically a buck-type derivative or a fly-back type circuit. It may also be a resonant converter with a rectified output. Prior art systems, such as the one illustrated by FIG. 1, typically require multiple switching devices. For example one switch may be associated with the power factor correction function in block 104 and one or more switching devices may be associated with the DC-to-DC converter of block 108.

Figure 2A:
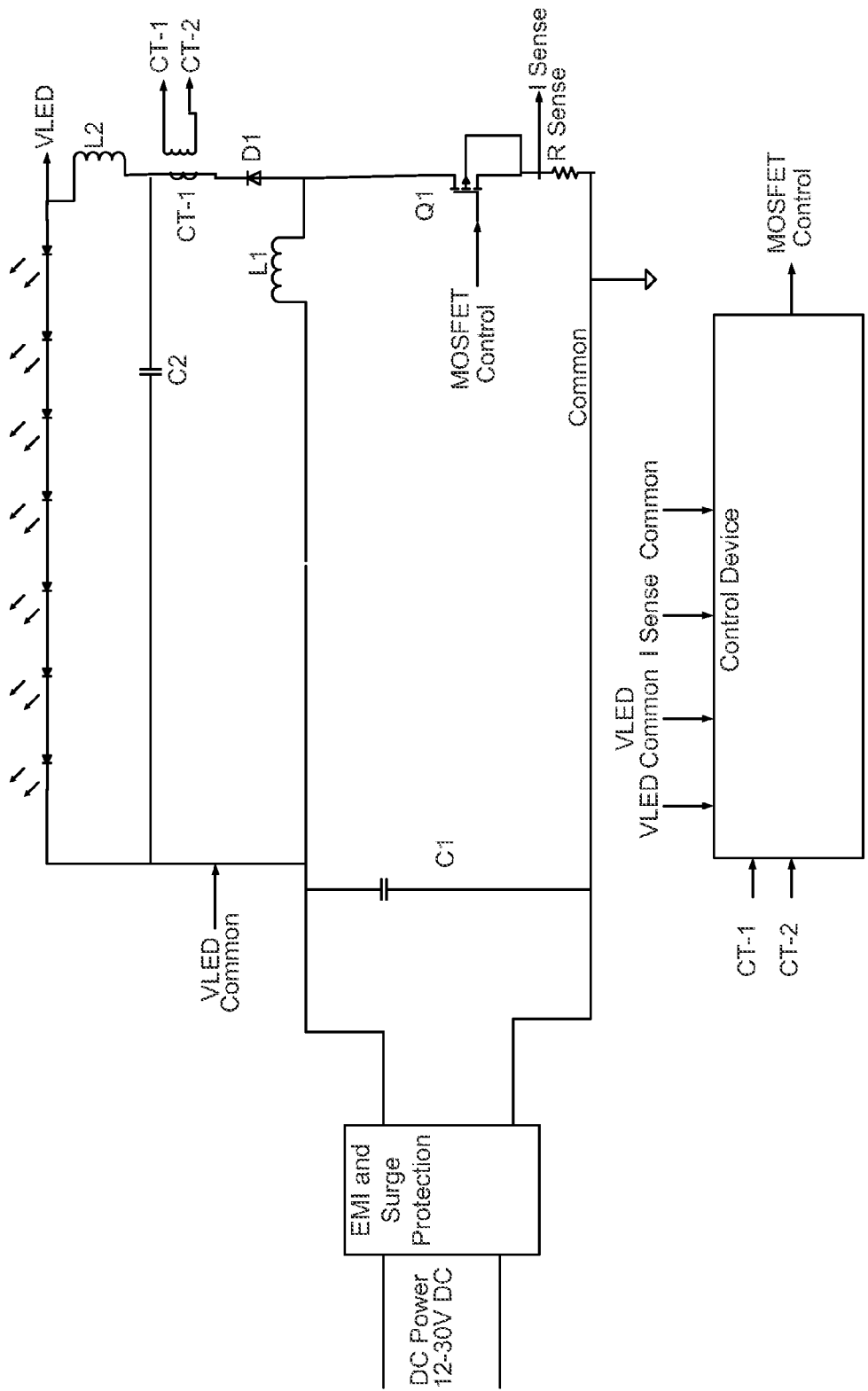
FIG. 2A is a circuit diagram of a prior art power circuit for an LED driver circuit driven from a low voltage DC source.

FIG. 2A illustrates a prior art buck-boost circuit that can be used to provide an approximately constant voltage to an LED array. This circuit can operate from a DC power source or an LED driver that provides a constant voltage. The circuit shown in FIG. 2A does not include PFC control or bulk energy storage. If the DC power source is connected to an AC power line, then the PFC control and bulk energy storage are provided by the power supply. In this case, a first stage that provides AC to DC conversion would be required, but this first stage is not shown in FIG. 2A.

Figure 2B:
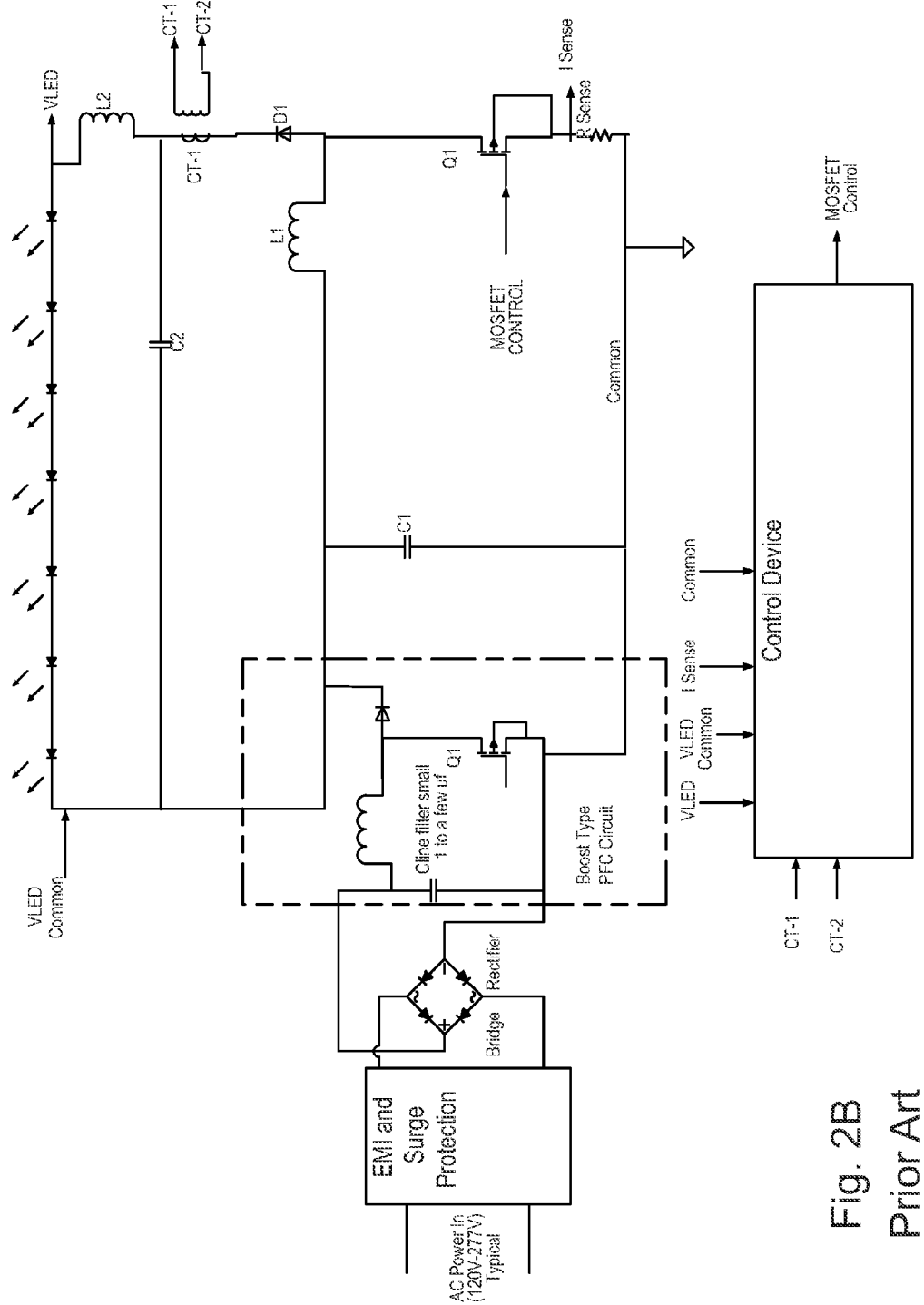
FIG. 2B is a circuit diagram of a prior art power circuit for an LED driver circuit driven from an AC source.

FIG. 2B illustrates a prior art circuit that includes a first stage that provides AC to DC conversion and PFC control. The bridge rectifier provides the AC to DC conversion and the portion of the circuit in dotted lines provides PFC control. FIG. 2B illustrates a boost type PFC circuit followed by a second buck or buck/boost converter. The large capacitor, C1, provides bulk energy storage.

Single Stage for PFC and Conversion

Figure 3:
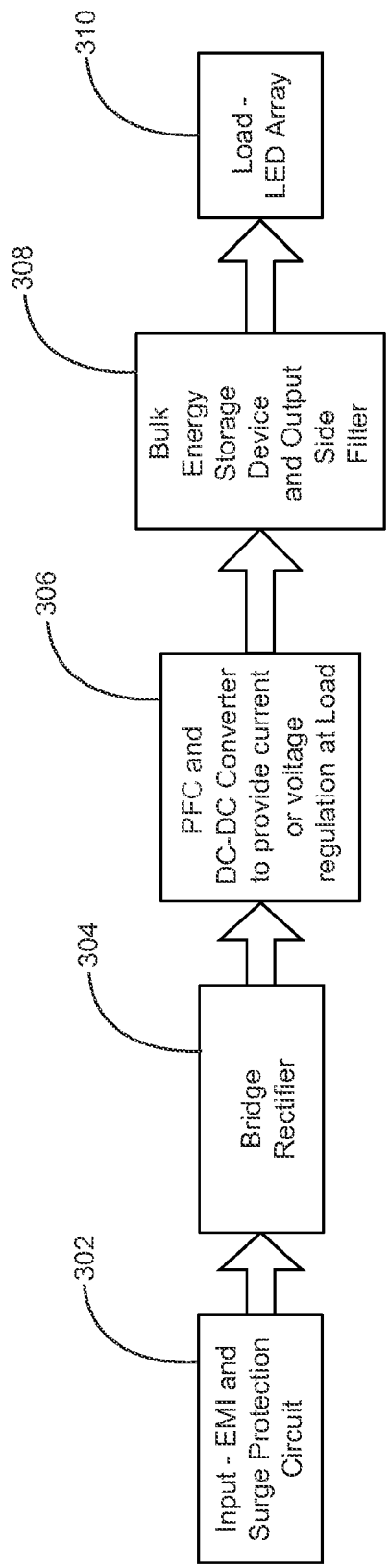
FIG. 3 is a block diagram of an exemplary LED driver circuit.

FIG. 3 illustrates a block diagram of an exemplary operating environment for the invention. The input voltage to the system is typically between 100V and 277V AC, which allows the system to work with most U.S. and European AC line voltages. Block 302 provides EMI filtering and surge protection. The bridge rectifier 304 rectifies the power signal from block 302. The output of the bridge feeds the PFC/converter circuit 306, which provides both PFC and voltage conversion. The bulk energy storage device and output side filter 308 are at the output of the PFC/converter circuit 306. The bulk energy storage device and output side filter helps provide a regulated current or a regulated voltage to the load 310. The bulk energy storage device stores energy from one power line cycle to the next power line cycle. The output side filtering provides high and low frequency filtering and stores energy from one conversion cycle to the next conversion cycle. The exemplary load shown in FIG. 3 is an LED array. A comparison of FIG. 1 to FIG. 3 shows that one aspect of the invention combines the separate PFC 104 and converter 108 circuits into a single stage circuit, the PFC/converter 306, which provides both PFC and conversion, and moves the bulk energy storage device to the output of the circuit in order to provide load regulation.

Figure 4:
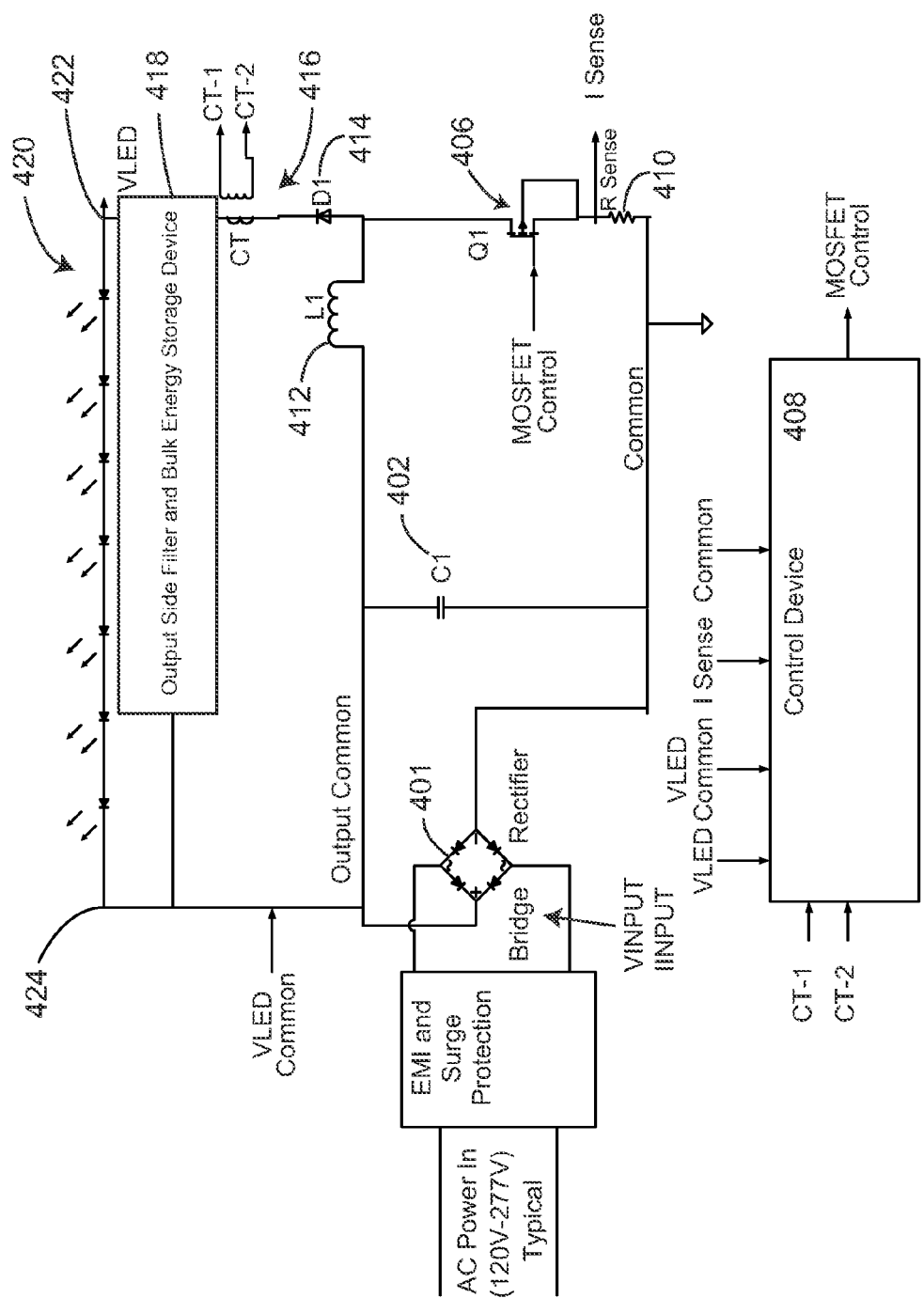
FIG. 4 is a circuit diagram of an exemplary power portion for the LED driver circuit of FIG. 3.

Single Stage with Bulk Energy Storage and Output Side Filtering—Based on a Buck-Boost Topology FIG. 4 illustrates an exemplary circuit for the PFC/converter 306 and the bulk energy storage and output side filter 308, based on a buck-boost topology, which allows the circuit to operate LED arrays at voltages above or below the AC line voltage. Other circuits that provide a DC voltage at the LED array of 1-1.2 times the RMS of the lowest AC line voltage could be based on a buck topology. FIG. 4 also includes a bridge rectifier 401.

The output side filter and bulk energy storage device 418 is connected to the LED array 420 at LED connection points 422, 424. As discussed in more detail in connection with FIGS. 5 and 8, in some circuits the bulk energy storage device is an inductor and in other circuits the bulk energy storage device is a capacitor. It is also possible to use a combination of an inductor and a capacitor as the bulk energy storage devices. Placing the bulk energy storage device at the output of the circuit eliminates the need for a separate PFC circuit. A capacitor and if present, an inductor provide additional output side filtering. FIG. 4 illustrates that the output side filter and bulk energy storage device 418 is connected to the first LED connection point 422, the second LED connection point 424, and to the cathode of a free wheeling diode 414. Some circuits include an optional current sense device. If the current sense device, CT 416, is present, then it may be connected between the output side filter and bulk energy storage device 418 and the cathode of the diode, as shown in FIG. 4.

The circuit includes a switch, Q1 406, controlled by a control device 408. The control device controls the switch to provide both PFC and a regulated current or voltage to the LED array, which is connected to the output of the circuit at LED connection points 422, 424. In this manner, only a single switch is required to provide both PFC and to control the current or voltage to the LED array. The control device 408 controls the switch to provide PFC using any one of several known control methods. For example, the on-time of the switch may be proportional to the current provided to the LED array or inversely proportional to the line voltage. Although FIG. 4 illustrates the switch as a MOSFET, other types of switches may be used. The control device can be an analog circuit, an ASIC, a microprocessor or any other suitable control device.

If the circuit is providing regulated current to the LED array, then in some circuits the control device controls the on-time of the switch based on inputs, CT-1, CT-2, from an optional current sense device, such as a current sense transformer, CT 416. In FIG. 4 the current sense device senses the current at a point between the cathode of the diode D1 414 and the output side filter and energy storage device 418. In other circuits, the control device controls the on-time of the switch based on inputs from an optional current sensing resistor $R_{Sense}$ 410. In FIG. 4 where the switch Q1 410 is implemented with a MOSFET, the current sensing resistor is connected to the source of the MOSFET. If the circuit is providing approximately constant voltage to the LED array, then the control device controls the on-time of the switch based on voltage inputs which represent the voltage across the LED array, $V_{LED}$ to $V_{LEDCommon}$. Some circuits can include both types of inputs to the control device so that the circuit can be used with a variety of LED arrays, whereas other circuits may include only one type of input to the control device and be used with one type of LED arrays. The control device may also use the current $I_{Sense}$ sensed through the current sensing resistor, $R_{Sense}$ 410, to control the switch on a cycle by cycle basis. If the current sensed through the current sensing resistor indicates an overcurrent condition, then the control device can immediately open the switch. As will be apparent to those skilled in the art, there are a number of other ways to control the switch to provide PFC.

An inductor, L1 412, separate from any inductor in the output side filter and bulk energy storage device, is connected to the switch, Q1 406 and to the anode of the diode D1 414 and to $V_{LEDCommon}$. The value of L1 412 depends upon the type of control, as well as the frequency of operation and the power requirements of the LED array. For example, in one circuit that operates in a discontinuous conduction mode (DCM), the inductor, L1 412, is relatively small with an exemplary value of 100 μH-1 MH. In other circuits that operate in a continuous conduction mode (CCM), the inductor, L1 412, is larger with an exemplary value of 1 MH and above. In FIG. 4 where the switch Q1 410 is implemented with a MOSFET, the inductor, L1 412, is connected to the drain of the MOSFET. The anode of a free-wheeling diode D1 414 is also connected to the switch Q1 406. There may be a high frequency filter, C1 402, at the input of the PFC/converter circuit. The high frequency filter may be a relatively small capacitor, C1 402, typically less than 1 μF. In FIG. 4, the high frequency filter is a capacitor, C1 402, and is connected to the inductor, L1 412, and $V_{LEDCommon}$ and to a circuit input.

Although not shown in FIG. 4, some circuits include lossless or semi-resonant snubber circuits at the switch to decrease switching losses, which in turn improves the reliability of the circuit. Additional details about the inclusion of an optional snubber circuit are discussed below in the section entitled Snubber Circuits.

Figure 5:
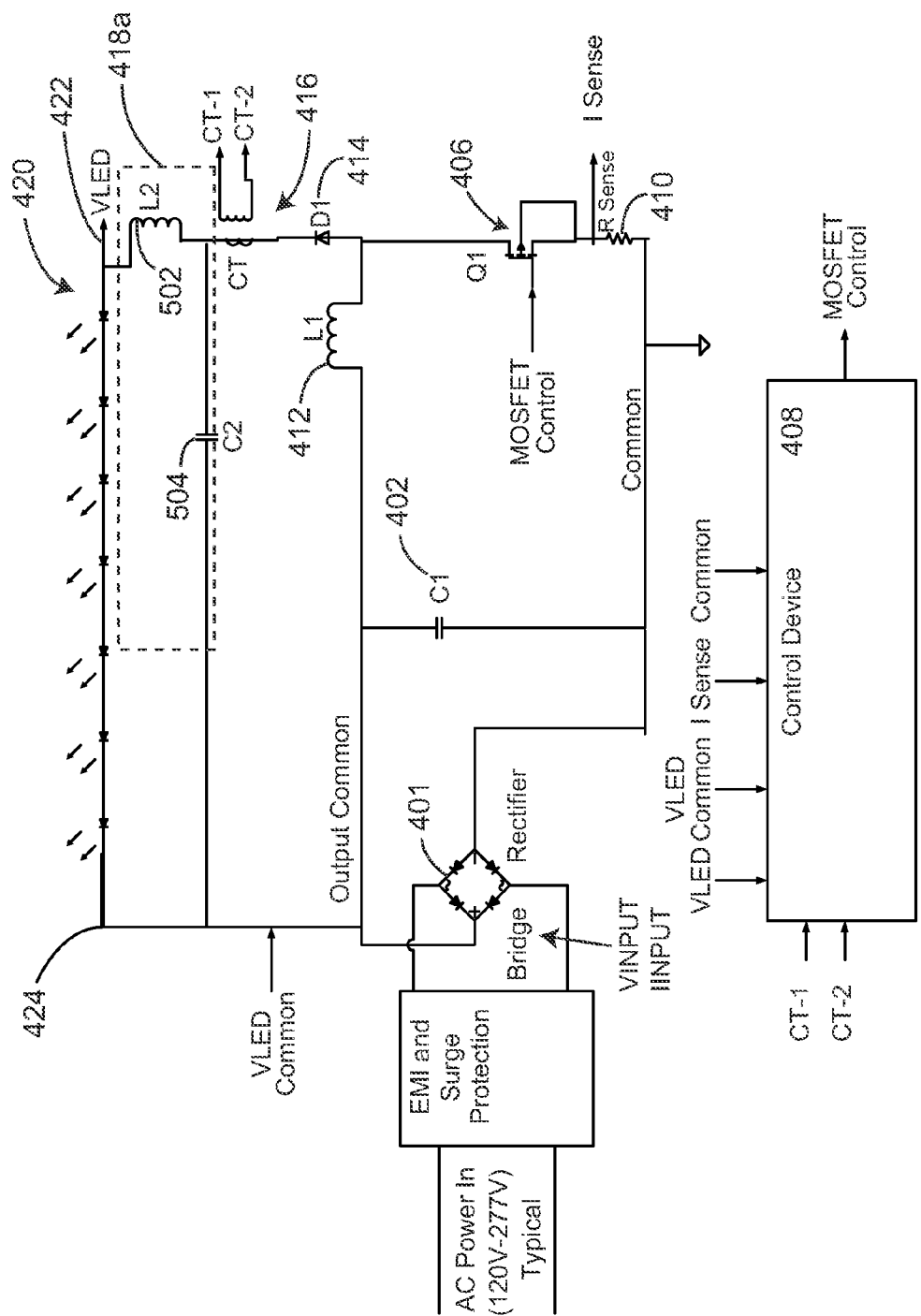
FIG. 5 is a circuit diagram of an exemplary power portion for an LED driver circuit.

Example Using an Inductor for Bulk Energy Storage in a Circuit Based on a Buck-Boost Topology FIG. 5 illustrates one drive circuit based on a buck-boost topology where the output side filter and bulk energy storage device 418a includes a small output side capacitor, C2 504, and an inductor, L2 502, and the inductor acts as the bulk energy storage device. In this circuit, the bulk energy storage device L2 502 is connected to the second LED connection point 422 on one side and to the output side capacitor, C2 504 and the cathode of the free wheeling diode D1, on the other side. The output side capacitor, C2 504, provides high frequency filtering and typically has a value of less than a few μF. The inductor, L2 502, provides low frequency filtering in addition to bulk energy storage and typically has a value between 25 mH to a few Henrys.

The remaining components are similar to those described in connection with FIG. 4. There is a high frequency filter at the input, such as a capacitor, C1 402 with a value typically less than a few μF. A control device 408 controls the switch, Q1 406, to provide both PFC and to regulate the current or voltage to the LED array. The control of the switch is similar to that described above in connection with FIG. 4.

FIG. 5 illustrates a circuit that includes the optional current sense device 416. The current sense device is useful if the circuit provides an approximately constant current to the LED array 420. If the circuit is providing an approximately constant voltage to the LED array 420, then the control device 408 may control the switch Q1 406 based on voltage inputs which represent the voltage across the LED array, $V_{LED}$ to $V_{LEDCommon}$. The control device may also use an optional current, $I_{Sense}$, sensed through the current sensing resistor, $R_{Sense}$ 410 to protect the switch against over current on a cycle by cycle basis.

A second inductor, L1 412, is connected between the high frequency input filter, C1, and the switch, Q1 406. The anode of a free-wheeling diode D1 414 is connected to the switch, Q1, and to one end of the inductor L1 412. The cathode of the free wheeling diode D1 414 is connected to the inductor L2 502, and the capacitor, C2 504, through the current sense device CT 416 if the circuit includes a current sense device. In those circuits that do not use a current sense device, the cathode of the free wheeling diode is connected directly to the inductor L2 502 and the capacitor, C2 504. The circuit illustrated by FIG. 5 has an output side filter and bulk energy storage device at its output, C2 504 and L2 502, and requires only a single switch, Q1 406, to provide both PFC and load regulation.

Figure 6:
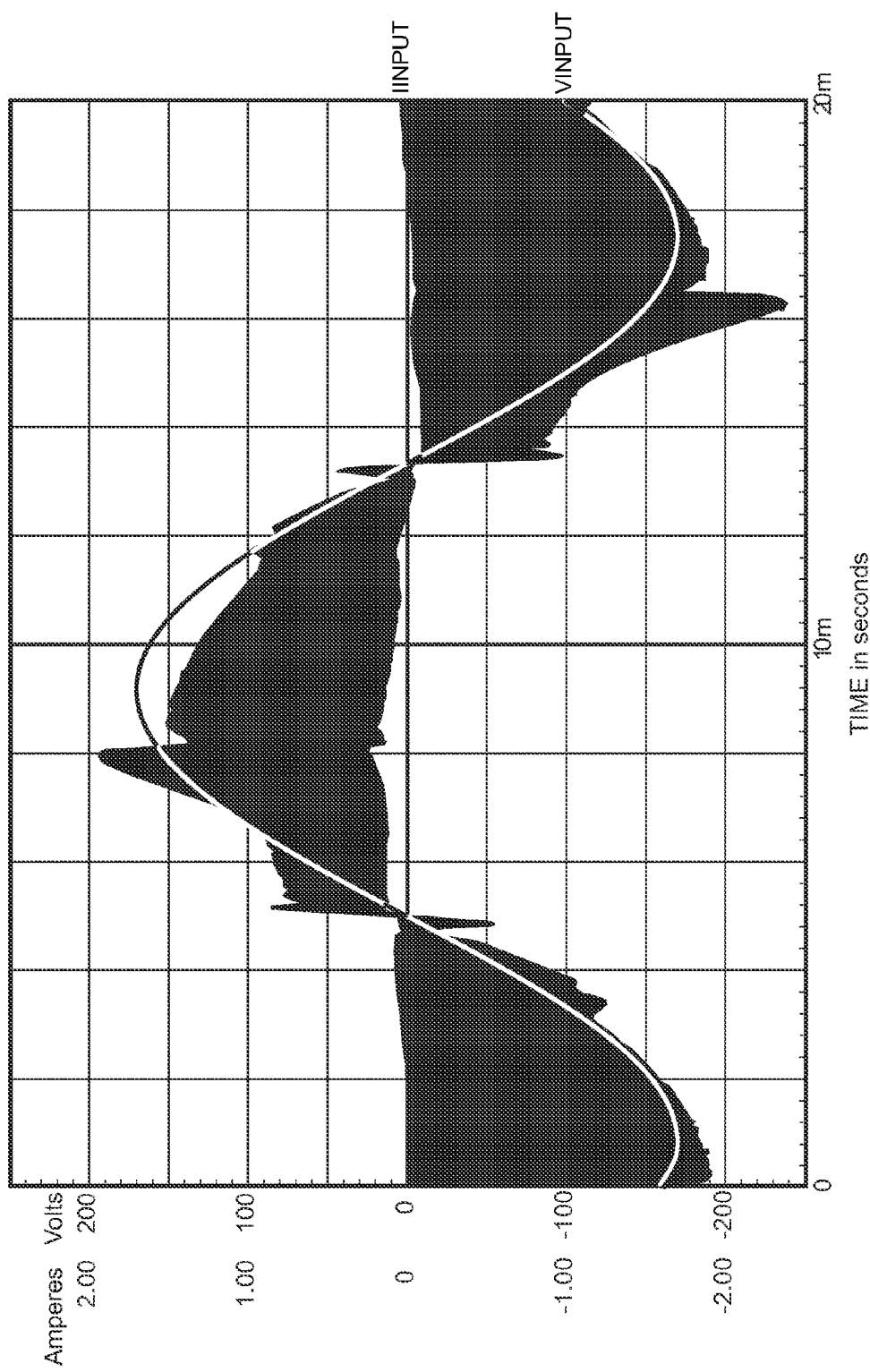
FIG. 6 is a graph illustrating voltage and current at a selected point in the circuit of FIG. 5.
Figure 7:
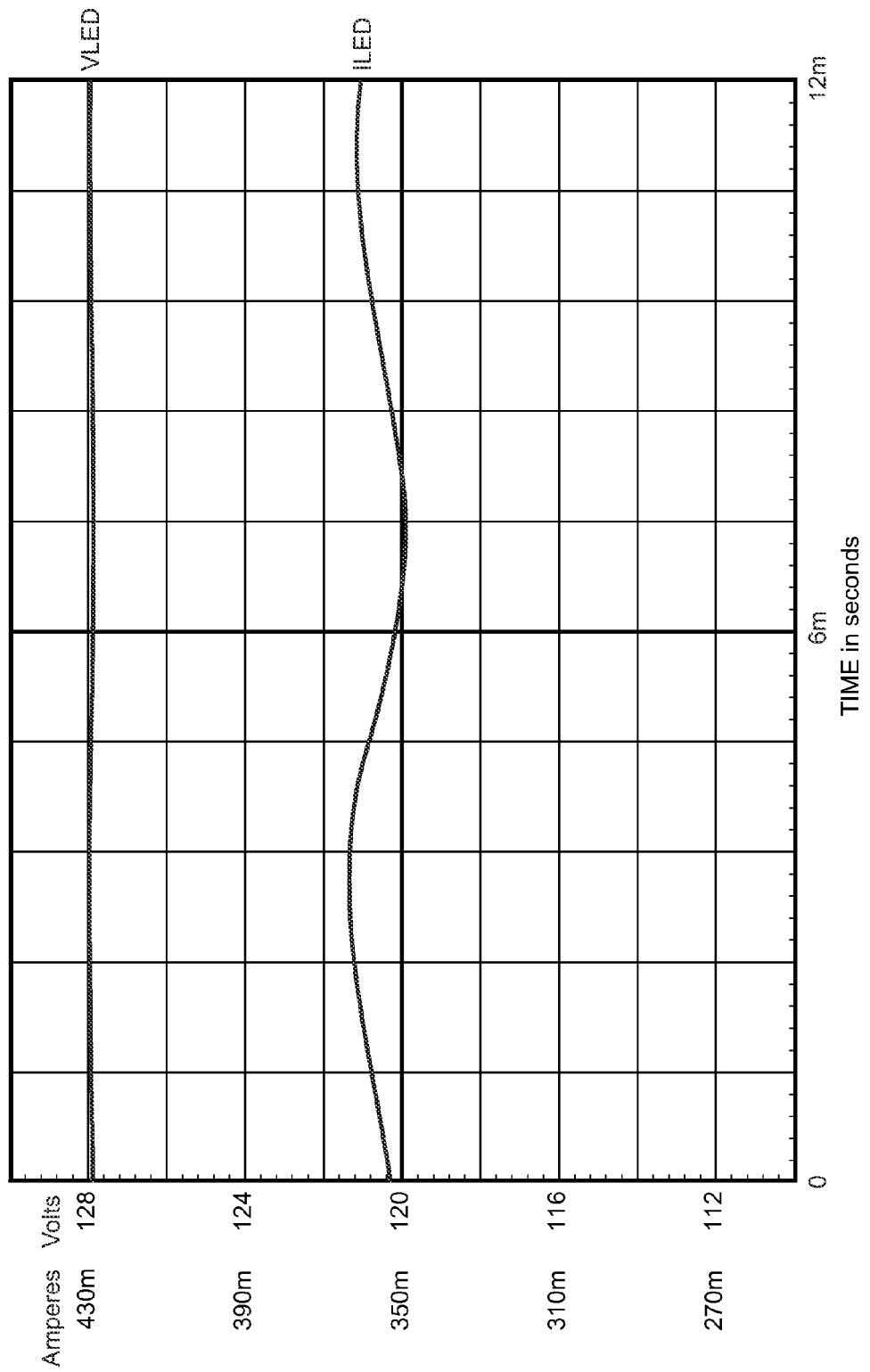
FIG. 7 is a graph illustrating voltage and current at the LED array for the circuit of FIG. 5.

FIGS. 6 and 7 illustrate the operation of a circuit, such as that illustrated in FIG. 5. FIG. 6 illustrates the change in voltage $V_{INPUT}$ and current $I_{INPUT}$ over time at a point between the EMI and surge protection block and the bridge rectifier. FIG. 7 illustrates the regulated current $I_{LED}$ and the regulated voltage $V_{LED}$ at the LED array. The values shown in FIGS. 6 and 7 are exemplary. As will be apparent to one skilled in the art, the values will vary for different implementations.

Example Using an Inductor and a Capacitor for Bulk Energy Storage in a Circuit Using a Buck-Boost Topology FIG. 5 also can be used to illustrate a circuit where the bulk energy storage device is a combined device that uses both a capacitor and an inductor for bulk energy storage. The capacitor and inductor that form the bulk energy storage device also provide the output side filtering. The difference between this circuit and the circuit discussed above where the bulk energy storage is provided by an inductor is that the values of the capacitor and the inductor differ. In this circuit, the relative energy stored and transferred to the load during an AC line cycle is similar (i.e., within one order of magnitude). Thus, both devices share in both the AC line frequency energy storage and the high frequency (converter switching frequency) filtering in a similar manner. For this circuit, the value of the capacitor C2 would typically be in the 10's of µF and the value of the inductor L2 would typically be in the 100's of mH.

Figure 8:
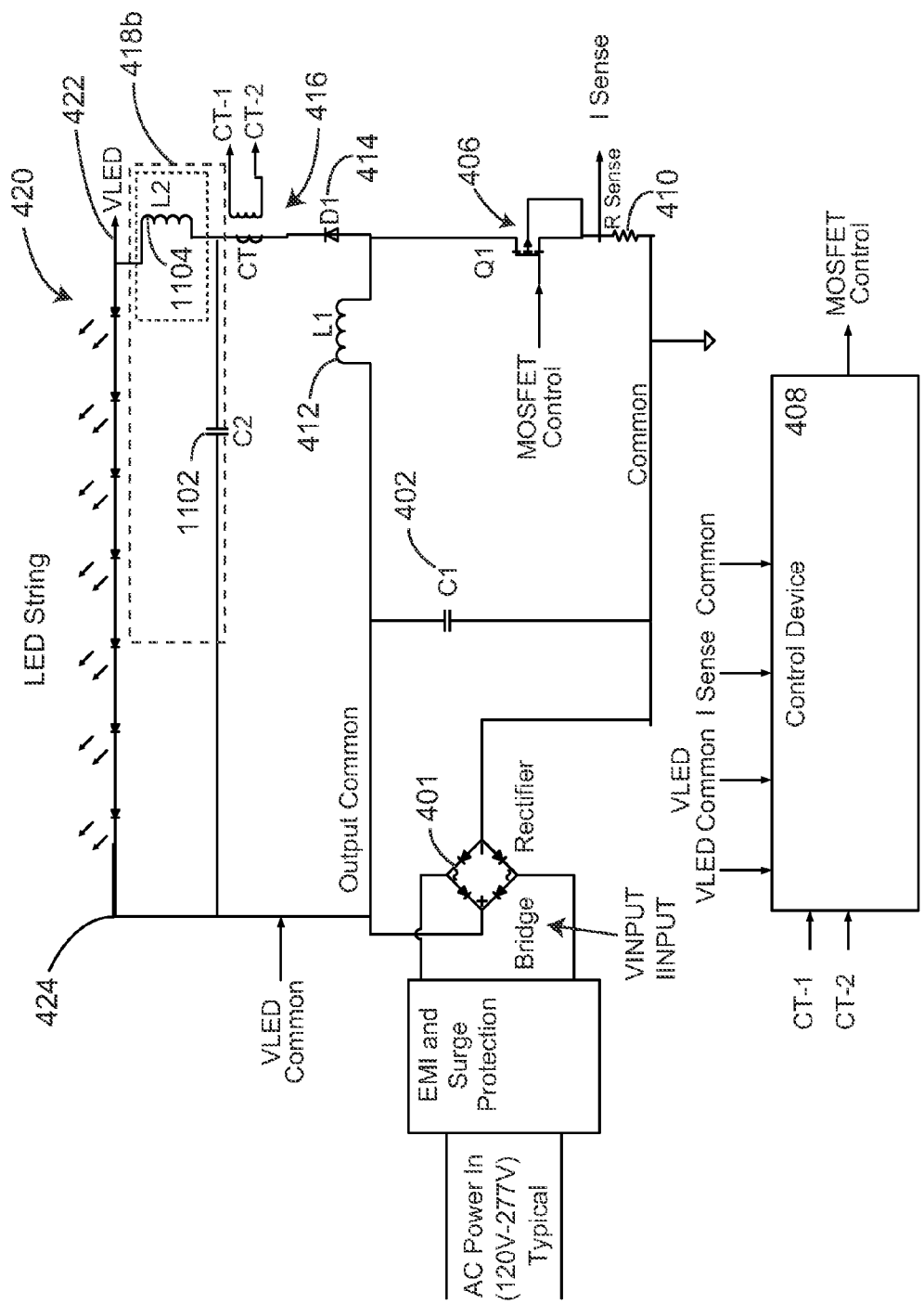
FIG. 8 is a circuit diagram of a portion of an exemplary LED driver circuit.

Example Using a Capacitor as Bulk Energy Storage Device in a Circuit Using a Buck-Boost Topology FIG. 8 illustrates an exemplary PFC/converter circuit based on a buck-boost topology where the output side filter and energy storage device 418b includes a capacitor, C2 1102 as the bulk energy storage device. In addition to bulk energy storage, the capacitor C2 1102 also provides high and low frequency output side filtering. The output side filter and energy storage device 418b may also include an optional inductor, L2 1104. If the inductor L2 1104 is included, then it provides additional output side high frequency filtering.

If the output side filter and energy storage device 418b includes only a capacitor, such as C2 1102, then the capacitor is connected to the first LED connection point 424 and the second LED connection point 422. If the output side filter and energy storage device 418b includes both a capacitor C2 1102 and an inductor L2 1104, then the capacitor is connected to the first LED connection point and to the inductor and the inductor is connected to the second LED connection point and to the capacitor.

The remaining components are similar to those described in connection with FIGS. 4 and 5. A control device 408 controls the switch, Q1 406, to provide both PFC and an approximately constant current (or voltage) to the LED array 420. The control of the switch is similar to that described above in connection with FIGS. 4 and 5. FIG. 8 illustrates an optional current sense device 416, which is used if the circuit is providing an approximately constant current to the LED array. There is a high frequency filter at the input, such as a small capacitor, C1 402.

An inductor L1 412 is connected between the high frequency input filter, C1 402 and the switch, Q1 406. The anode of a free-wheeling diode D1 416 is connected to the switch, Q1, and to one end of the inductor L1. The cathode of the free wheeling diode D1 is connected to the bulk energy storage device, C2 through the current sense device, if it is present. In those circuits that do not use a current sense device, the cathode of the free wheeling diode is connected directly to the capacitor, C2. The cathode of the free wheeling diode D1 may also be connected to the inductor, L2 if present, either through the current sense device or directly to the inductor L2. As will be apparent to those of skill in the art, other means of current sensing could be used in the circuit illustrated in FIG. 8.

Snubber Circuits

Figure 9:
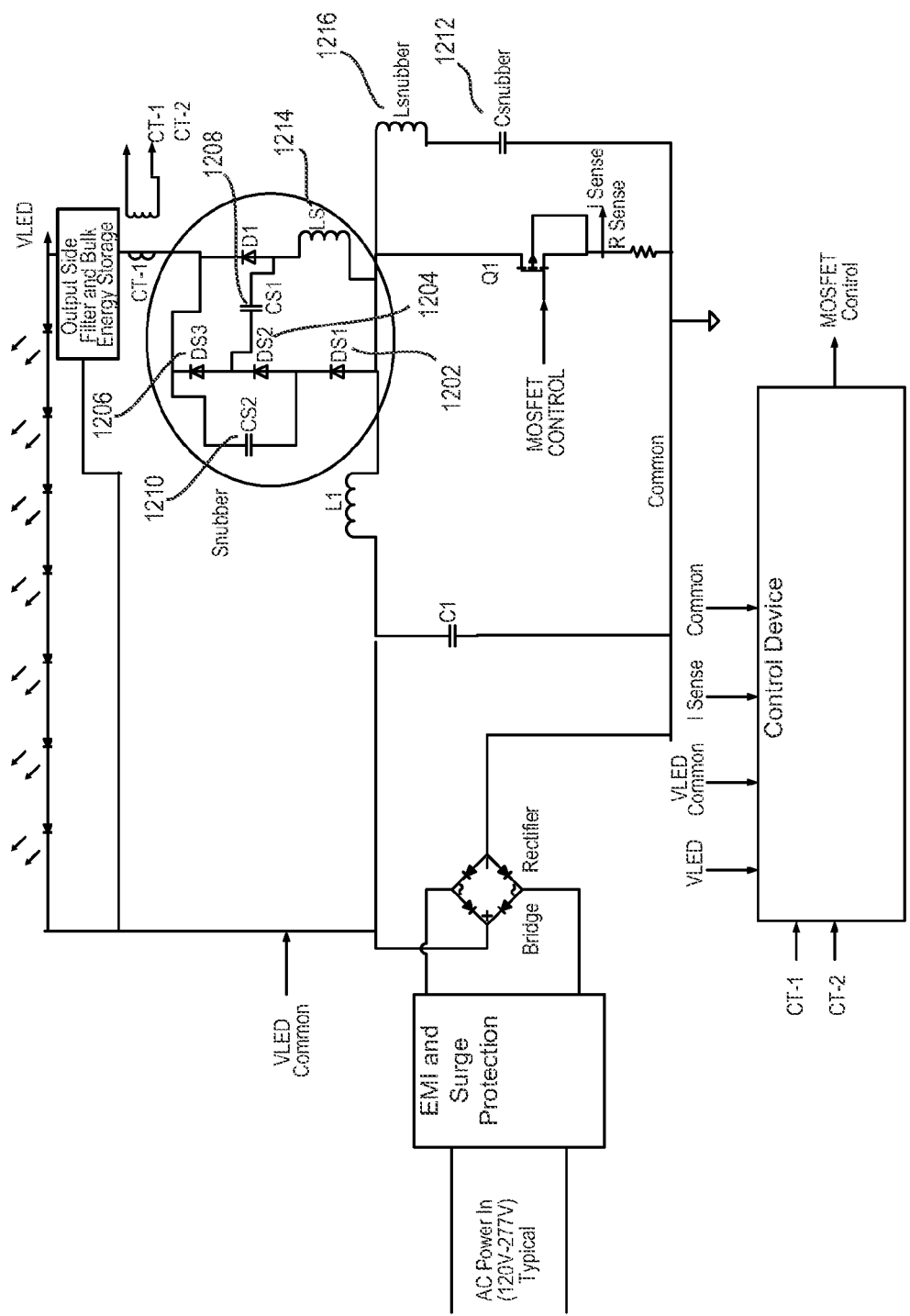
FIG. 9 is a circuit diagram of an exemplary LED driver circuit with a snubber circuit.
Figure 10:
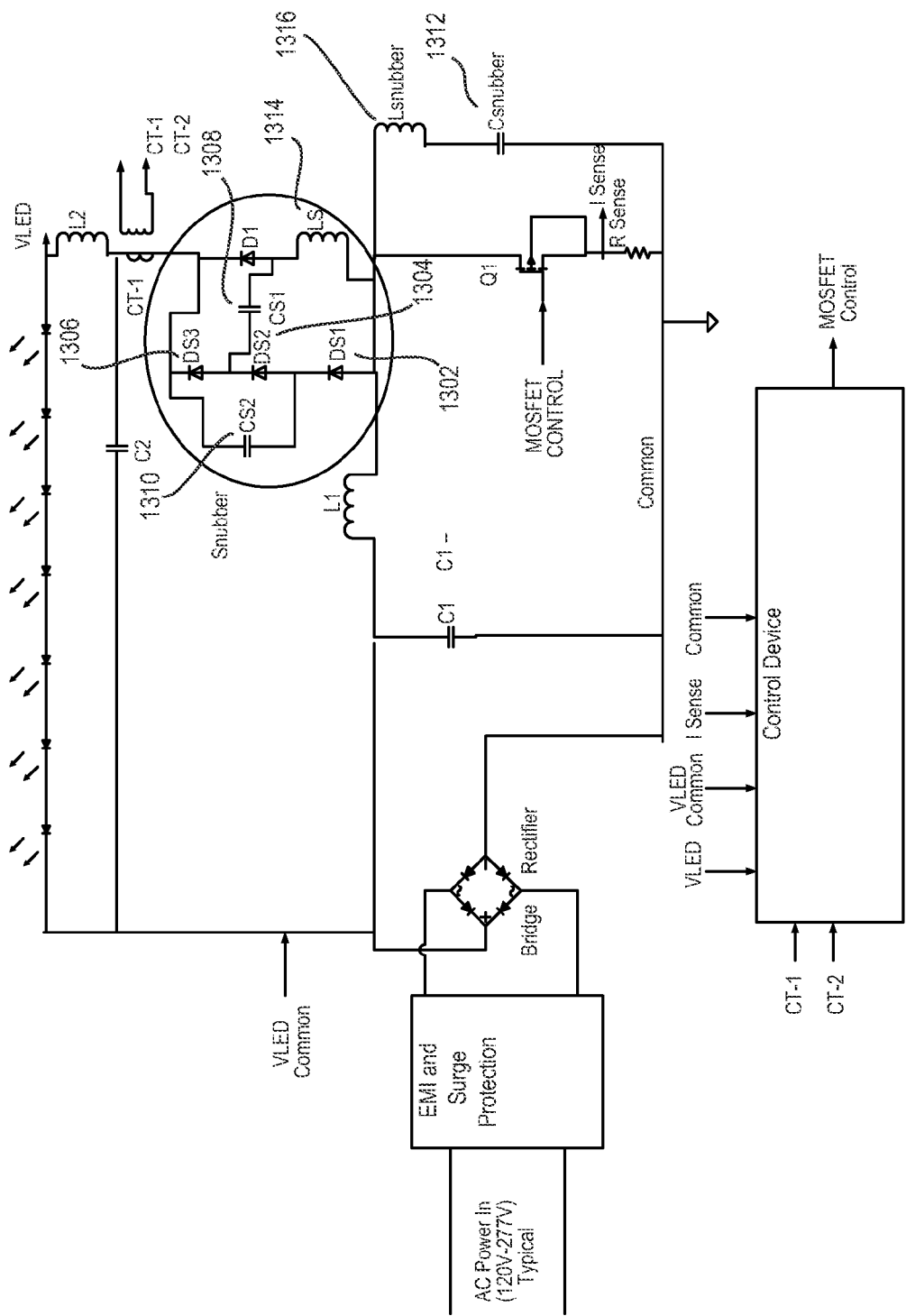
FIG. 10 is a circuit diagram of an exemplary LED driver circuit with a snubber circuit.
Figure 11:
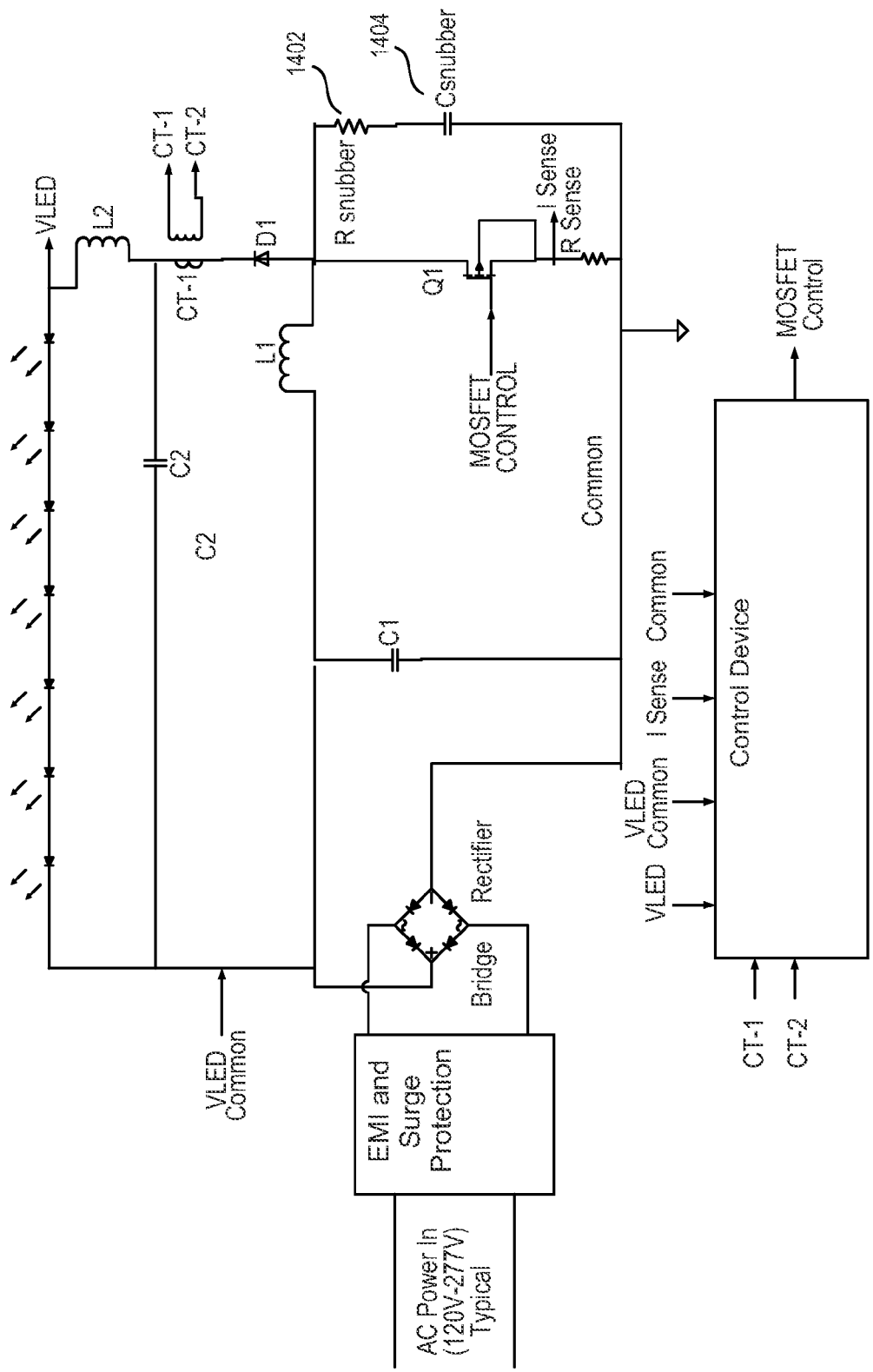
FIG. 11 is a circuit diagram of an exemplary LED driver circuit with a snubber circuit.

As discussed above, adding a snubber circuit at the switch decreases switching losses and improves the reliability of the circuit. FIGS. 9-11 provide examples of some circuits that include snubber circuits. FIG. 9 illustrates the circuit of FIG. 4 with the addition of a lossless snubber circuit. Adding a snubber circuit to the circuit of FIG. 4 adds three diodes, DS1 1202, DS2 1204, DS3 1206, three capacitors, CS1 1208, CS2 1210, $C_{Snubber}$ 1212, and two inductors, LS 1214 and $L_{Snubber}$ 1216. FIG. 10 illustrates the circuit of FIG. 5 with the addition of a lossless snubber circuit. Adding a snubber circuit to the circuit of FIG. 5 adds three diodes, DS1 1302, DS2 1304, DS3 1306, three capacitors, CS1 1308, CS2 1310, $C_{Snubber}$ 1312, and two inductors, LS 1314 and $L_{Snubber}$ 1316. FIG. 11 illustrates the circuit of FIG. 5 with the addition of a standard R-C snubber circuit. Adding a snubber circuit to the circuit of FIG. 5 adds a resistor, Rsnubber 1402, and a capacitor, $C_{Snubber}$ 1404. As will be apparent to one of skill in the art, there are many other snubber circuit designs that can be used and the invention is not limited to those illustrated by the figures.

Additional Circuit Topologies

In addition to the buck-boost topology described above, other circuit topologies can be used for providing PFC and conversion in a single stage with a bulk energy storage device at the output. The following sections provide additional details on circuits that use a SEPIC (Single-Ended Primary-Inductor Converter) or Cuk topology.

Figure 12:
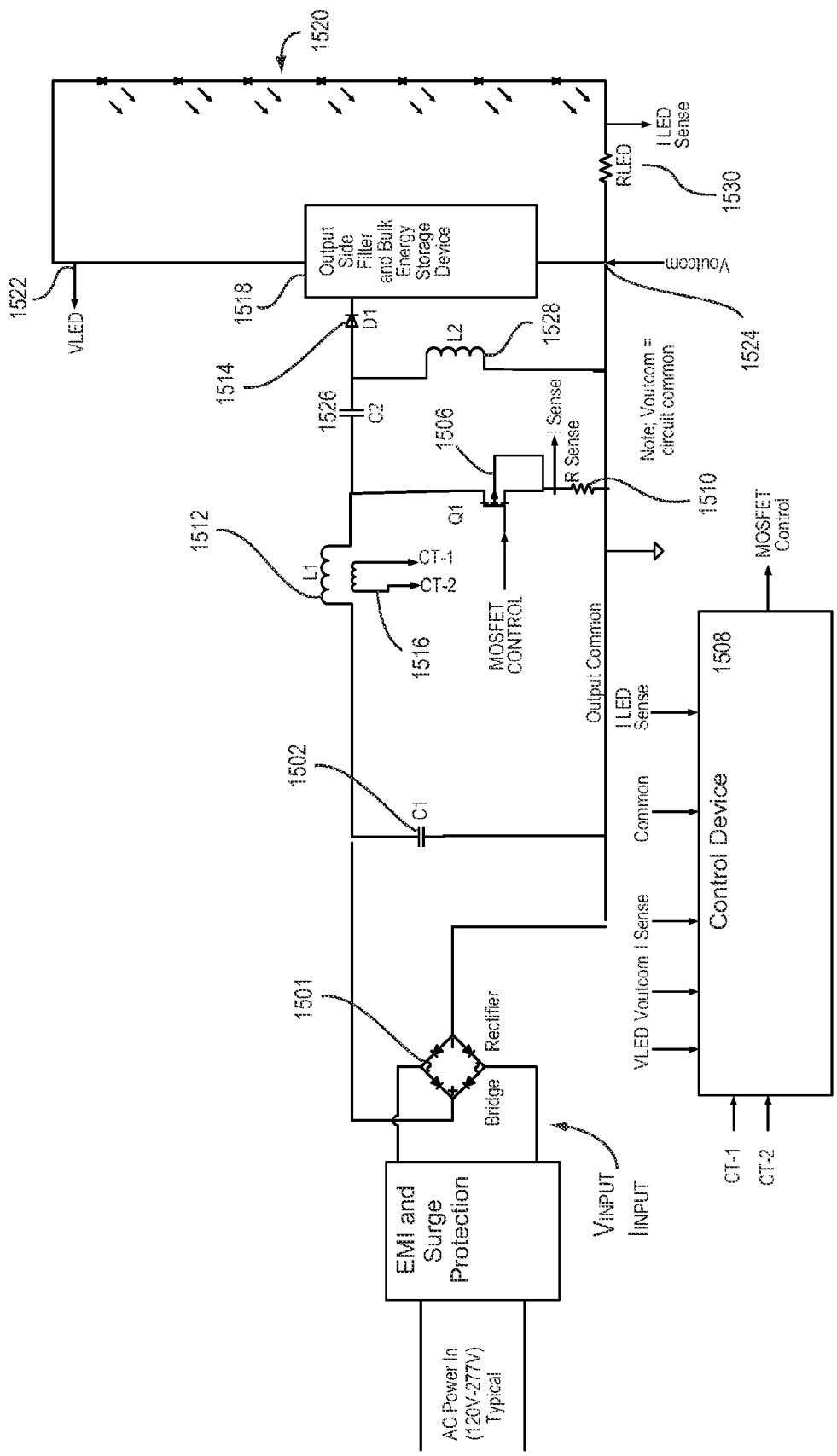
FIG. 12 is a circuit diagram of an exemplary power portion for the LED driver circuit of FIG. 3.

Single Stage with Bulk Energy Storage and Output Side Filtering—Based on a SEPIC Topology FIG. 12 illustrates an exemplary PFC/converter 306 and the bulk energy storage and output side filter 308, based on a SEPIC topology, which allows the circuit to operate LED arrays at voltages above or below the AC line voltage. FIG. 12 also includes a bridge rectifier 1501.

The output side filter and bulk energy storage device 1518 is connected to a first LED connection point 1524 and a second LED connection point 1522, as well as to the cathode of a free wheeling diode, D1 1514. As discussed in more detail in connection with FIGS. 13 and 16, in some circuits the bulk energy storage device is a capacitor and in other circuits the bulk energy storage device is an inductor. It is also possible to use a combination of an inductor and a capacitor as the bulk energy storage devices. Placing the bulk energy storage device at the output of the circuit eliminates the need for a separate PFC circuit. A capacitor and if present, an inductor provide additional output side filtering. FIG. 12 illustrates an inductor, L2 1528, is connected to the anode of the diode, D1 1514, and to the first LED connection point 1524. A capacitor, C2 1526, is connected at one end to both the anode of the diode, D1 1514, and the inductor, L2 1528, and at the other end to another inductor, L1 1512. An optional resistor, $R_{LED}$ 1530 is shown in FIG. 12, which is connected to the first LED connection point 1524 and is in series with the LED array 1520. The resistor, $R_{LED}$ 1530 provide LED current sensing.

The circuit includes a switch, Q1 1506, controlled by a control device 1508. The control device controls the switch to provide both PFC and a regulated current or voltage to the LED array, which is connected to the output of the circuit at LED connection points 1522, 1524. In this manner, only a single switch is required to provide both PFC and to control the current or voltage to the LED array. The control device 1508 controls the switch to provide PFC using any one of several known control methods. For example, the on-time of the switch may be proportional to the current provided to the LED array or inversely proportional to the line voltage. Although FIG. 12 illustrates the switch as a MOSFET, other types of switches may be used. The control device can be an analog circuit, an ASIC, a microprocessor or any other suitable control device.

If the circuit is providing regulated current to the LED array, then in some circuits the control device controls the on-time of the switch based on inputs, CT-1, CT-2, from an optional current sense device, such as a current sense transformer, CT 1516. In FIG. 12 the current sense device senses the current through the inductor, L1 1512. In other circuits, the control device controls the on-time of the switch based on inputs from an optional current sensing resistor R$_{Sense}$ 1510. In FIG. 12 where the switch Q1 1510 is implemented with a MOSFET, the current sensing resistor is connected to the source of the MOSFET. If the circuit is providing approximately constant voltage to the LED array, then the control device controls the on-time of the switch based on voltage inputs which represent the voltage across the LED array, V$_{LED}$ to V$_{outcom}$. Some circuits can include both types of inputs to the control device so that the circuit can be used with a variety of LED arrays, whereas other circuits may include only one type of input to the control device and be used with one type of LED arrays. The control device may also use the current I$_{Sense}$ sensed through the current sensing resistor, R$_{Sense}$ 410, to control the switch on a cycle by cycle basis. If the current sensed through the current sensing resistor indicates an overcurrent condition, then the control device can immediately open the switch. As will be apparent to those skilled in the art, there are a number of other ways to control the switch to provide PFC.

Figure 15:
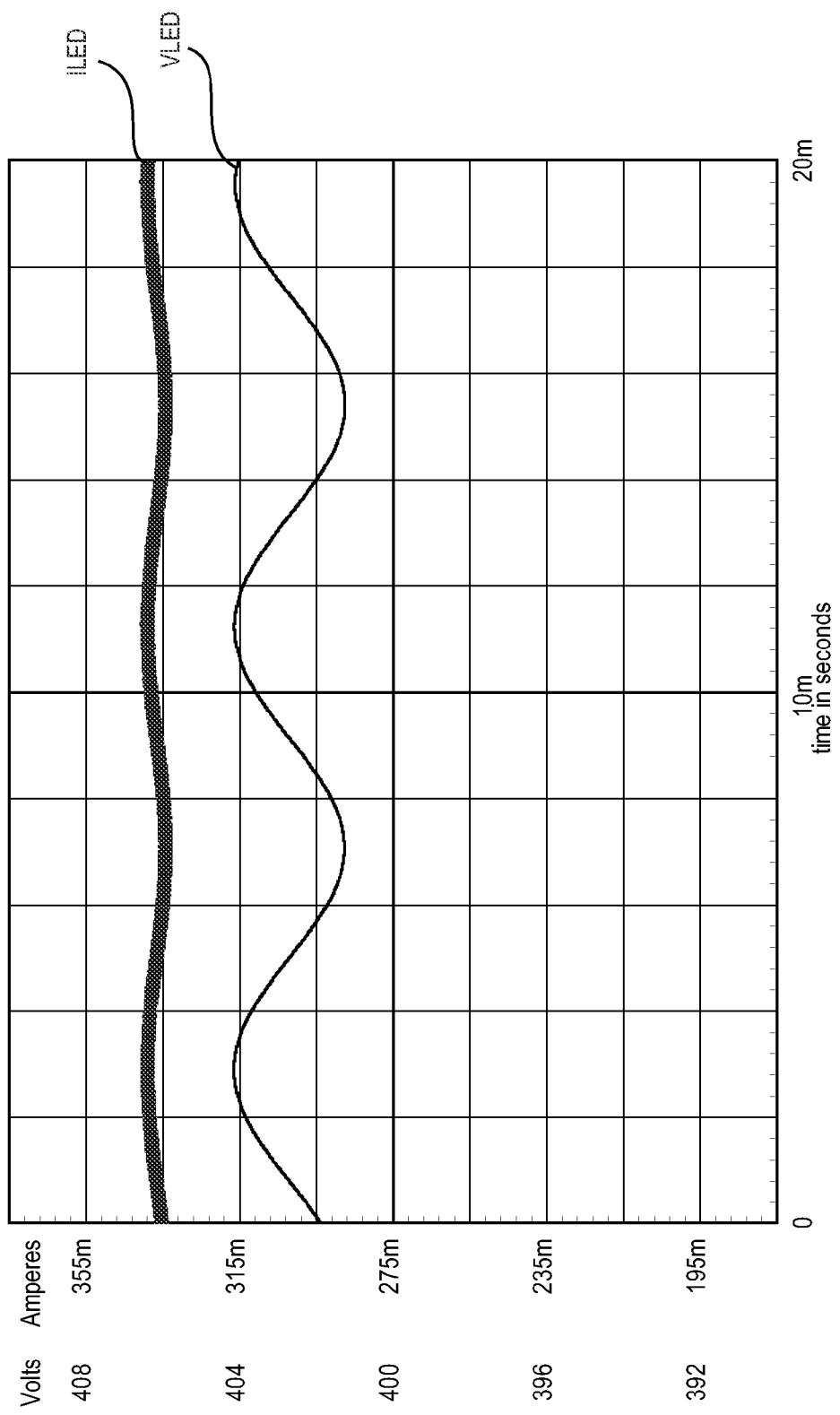
FIG. 15 is a graph illustrating voltage and current at the LED array for the circuit of FIG. 13.

The inductor, L1 1512, is connected to the switch, Q1 406, and to C2 1526. The value of L1 1512 depends upon the type of control, as well as the frequency of operation and the power requirements of the LED array. For example, in one circuit that operates in a discontinuous conduction mode (DCM), the inductor, L1 1512, is relatively small with an exemplary value of 100 µH-1 MH. In another circuit that operates in a continuous conduction mode (CCM), the inductor, L1 1512, is larger with an exemplary value of 1 MH and above. In FIG. 15 where the switch, Q1 1510, is implemented with a MOSFET, the inductor, L1 1512, is connected to the drain of the MOSFET. There may be a high frequency filter, C1 1502, at the input of the PFC/converter circuit. The high frequency filter may be a relatively small capacitor, C1 1502, typically less than 1 µF.

Figure 13:
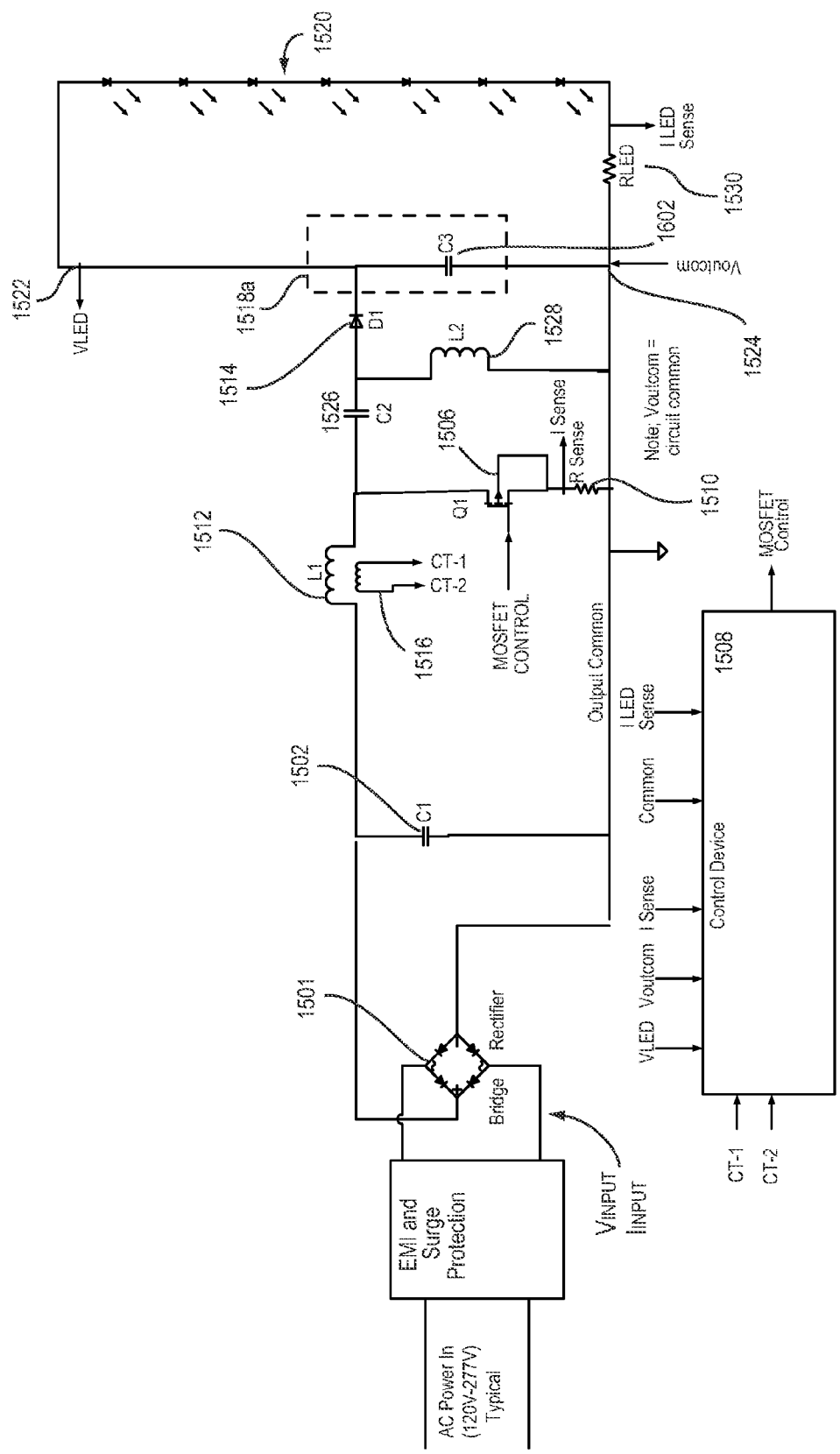
FIG. 13 is a circuit diagram of an exemplary portion of an LED driver circuit.

FIG. 13 illustrates an exemplary PFC/converter circuit based on a SEPIC topology where the output side filter and energy storage device 1518a includes a capacitor, C3 1602, as the bulk energy storage device. In addition to bulk energy storage, the capacitor C3 1602 also provides high and low frequency output side filtering. In one implementation, the bulk energy storage device includes four 100 µF capacitors or the equivalent thereof. If the output side filter and energy storage device 1518a includes only a capacitor, such as C3 1602, then one side of the capacitor is connected to the LED connection point 1522 and the cathode of the diode 1526 and the other side of the capacitor is connected to the other LED connection point 1524.

The remaining components are similar to those described in connection with FIG. 12. A control device 1508 controls the switch, Q1 1506, to provide both PFC and an approximately constant current (or voltage) to the LED array 1520. The control of the switch is similar to that described above in connection with FIG. 12. FIG. 13 illustrates an optional current sense device 1516, which is used if the circuit is providing an approximately constant current to the LED array. There is a high frequency filter at the input, such as a small capacitor, C1 1502.

An inductor, L1 1512, is connected between the high frequency input filter, C1 1502, and the switch, Q1 1506, as well as to C2 1526. The capacitor, C2 1526, is connected on one side to the inductor, L1 1512, and the switch, Q1 1506, and on the other side to another inductor, L2 1528, and the anode of the diode, D1 1514.

Figure 14:
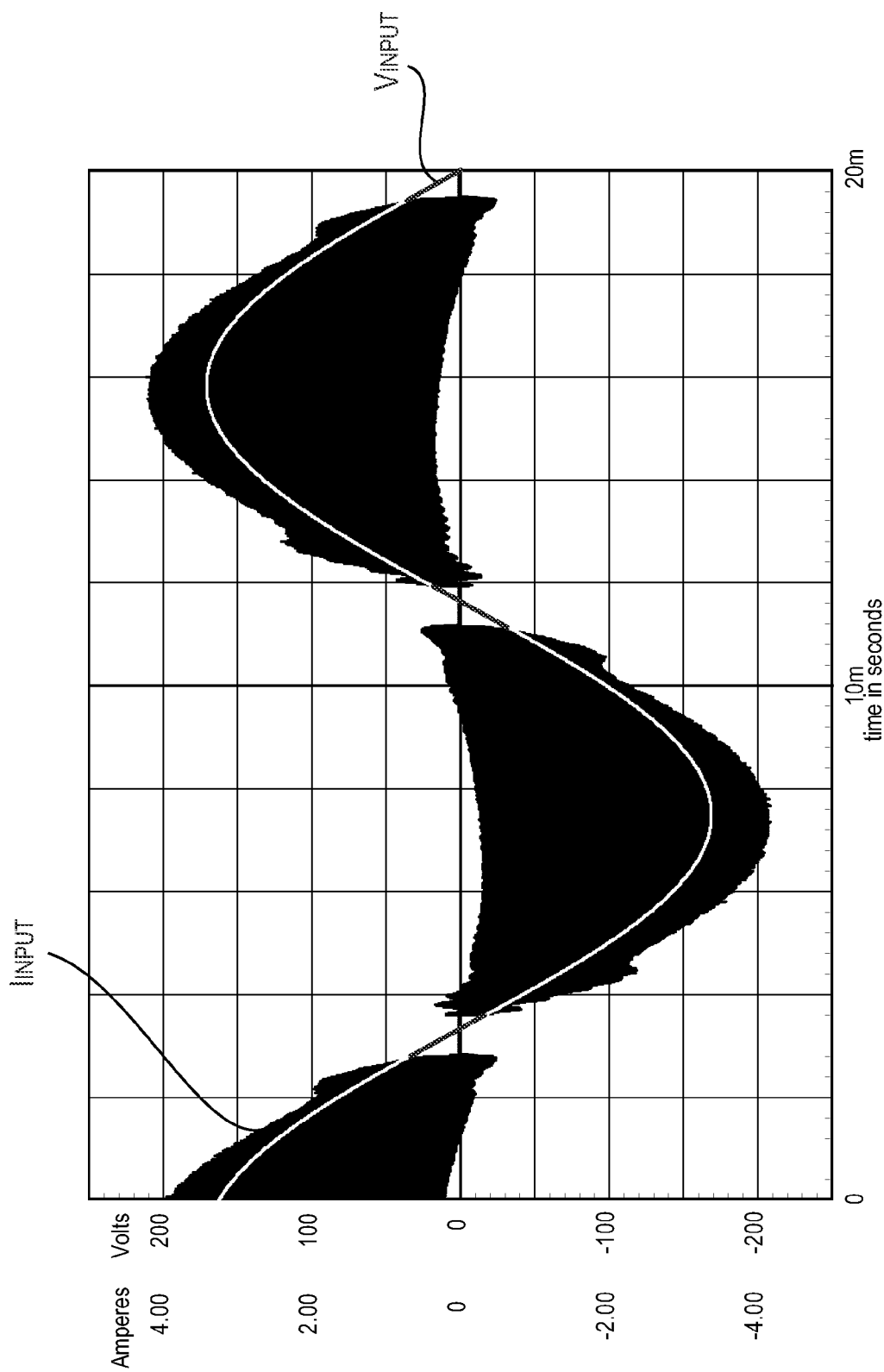
FIG. 14 is a graph illustrating voltage and current at a selected point in the circuit of FIG. 13.

FIGS. 14 and 15 illustrate the operation of a circuit, such as that illustrated in FIG. 13. FIG. 14 illustrates the change in voltage V$_{INPUT}$ and current I$_{INPUT}$ over time at a point between the EMI and surge protection block and the bridge rectifier. FIG. 15 illustrates the regulated current I$_{LED}$ and the regulated voltage V$_{LED}$ at the LED array. The values shown in FIGS. 14 and 15 are exemplary. As will be apparent to one skilled in the art, the values will vary for different implementations.

Although FIG. 13 illustrates a circuit where the output side filter and bulk energy storage device is a capacitor, similar to the buck-boost circuits described above, in other circuits the output side filter and bulk energy storage device may include both a capacitor and an inductor and the bulk energy storage may be provided by the inductor or a combination of a capacitor and an inductor.

Figure 16:
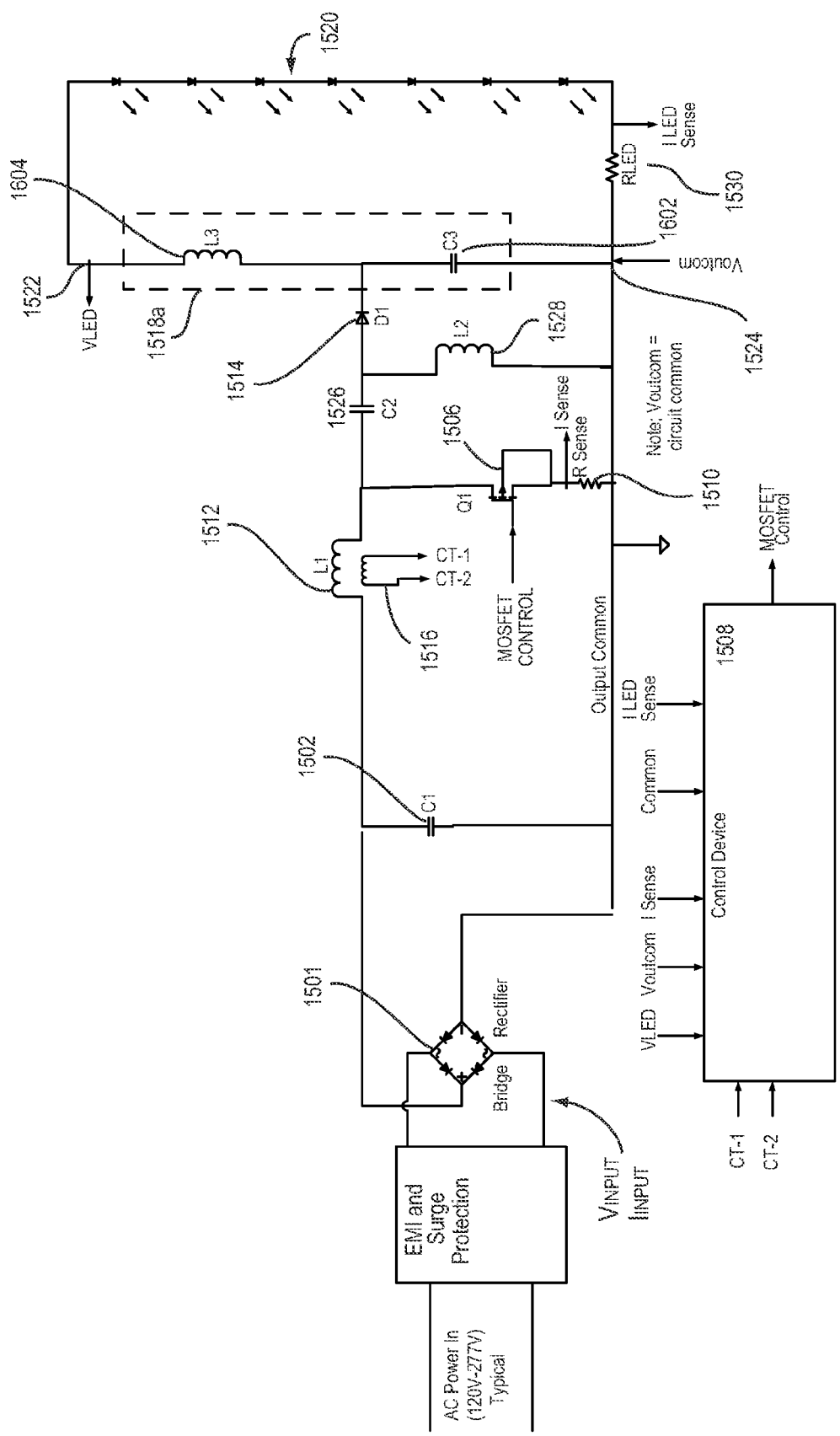
FIG. 16 is a circuit diagram of an exemplary portion of an LED driver circuit.

FIG. 16 illustrates an example where the output side filter and bulk energy storage device includes both a capacitor, C3 1602, and an inductor, L3 1604. In one implementation, the capacitor, C3 1602, acts as the bulk energy storage device and provides output side filtering and the inductor, L3 1604, provides additional output side filtering. In a second implementation, both the capacitor, C3 1602, and the inductor, L3 1604, provide bulk energy storage, as well as output side filtering. In a third implementation, the inductor, L3 1604 provides bulk energy storage and output side filtering and the capacitor, C3 1602 provides additional output side filtering. In FIG. 16, the inductor, L3 1604 is connected to the cathode of the diode, D1 1514 and the capacitor, C3 1602, and to the second LED connection point 1522. The remaining components are similar to those described in connection with FIG. 14.

Figure 17:
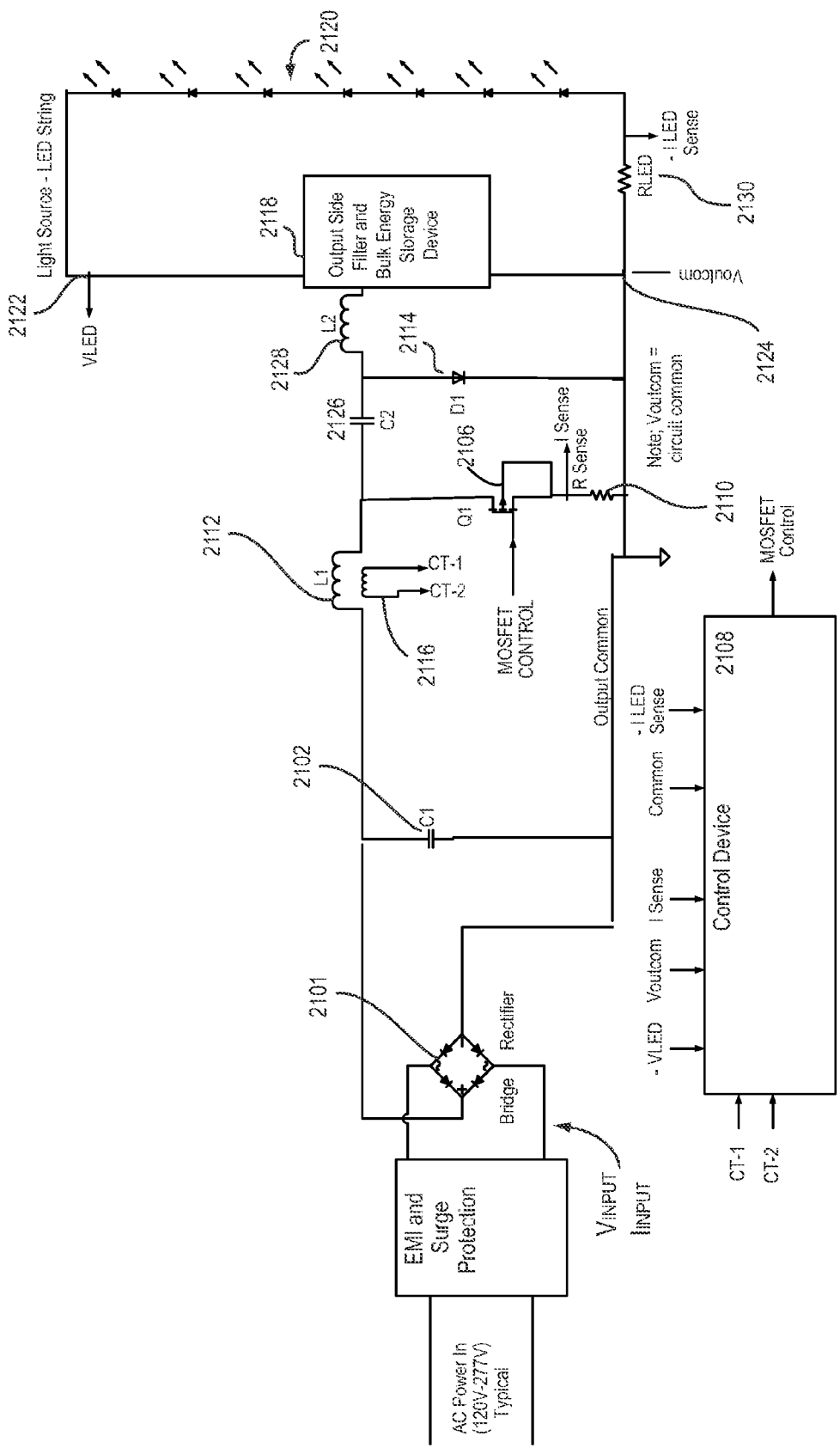
FIG. 17 is a circuit diagram of an exemplary power portion of the LED driver circuit of FIG. 3.

Single Stage with Bulk Energy Storage and Output Side Filtering Based on a Cuk Topology FIG. 17 illustrates an exemplary PFC/converter 306 and bulk energy storage and output side filter 308, based on a Cuk topology, which allows the circuit to operate LED arrays at voltages above or below the AC line voltage. FIG. 17 also includes a bridge rectifier 2101. A comparison between FIGS. 12 and 17 shows that both the SEPIC and Cuk topologies include a sub-circuit that includes a capacitor, two inductors, a switch and a diode connected between the input of the circuit and the output side filter and bulk energy storage device, but that the arrangement of the capacitor, inductors, switch and diode differ between the two topologies.

Figure 21:
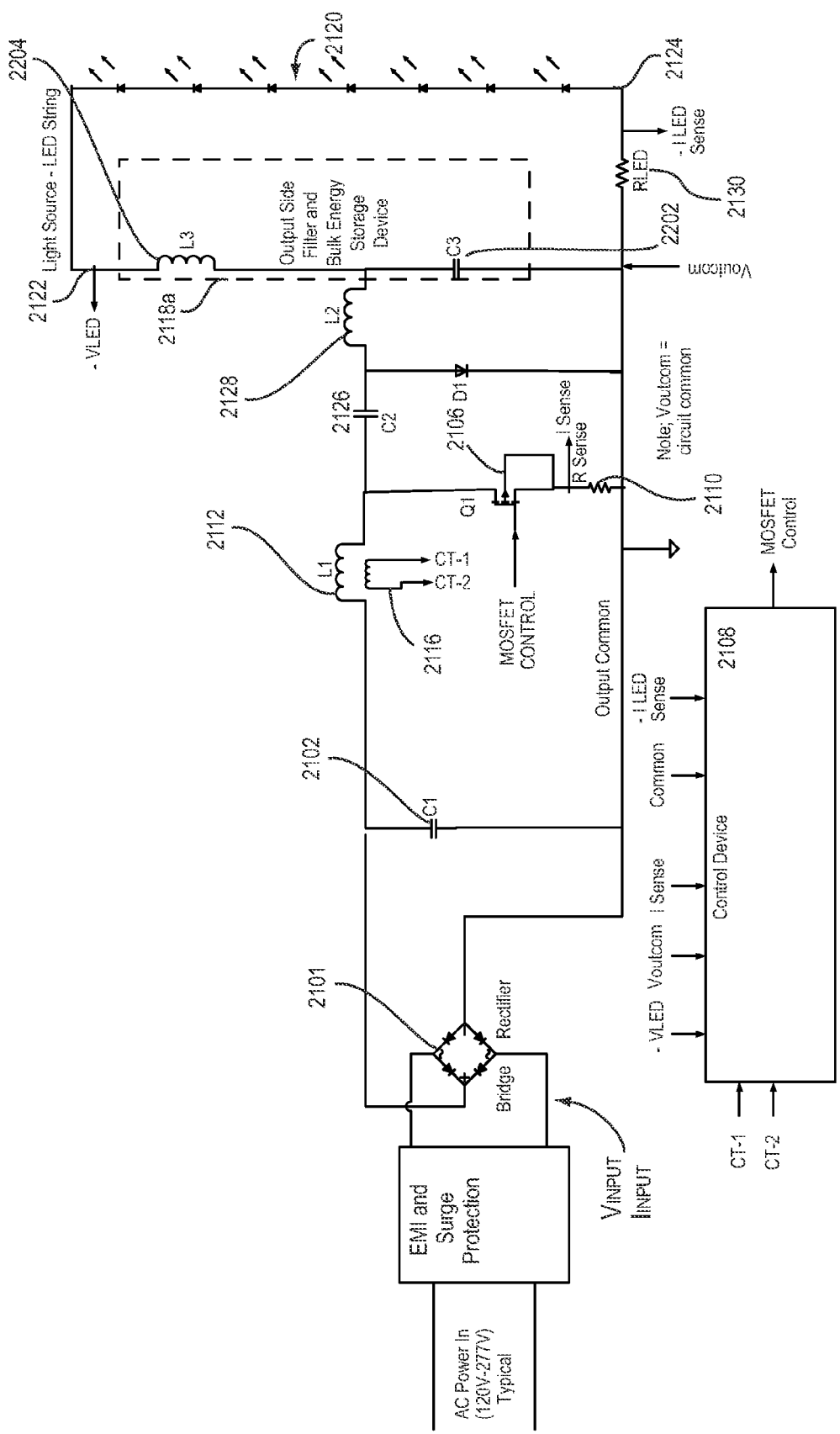
FIG. 21 is a circuit diagram of an exemplary portion of an LED driver circuit.

The output side filter and bulk energy storage device 2118 is connected to the first LED connection point 2124 and the second LED connection point 2122, as well as an inductor, L2 2128. As discussed in more detail in connection with FIGS. 17 and 21, in some circuits the bulk energy storage device is a capacitor and in other circuits the bulk energy storage device is an inductor. It is also possible to use a combination of an inductor and a capacitor as the bulk energy storage devices. Placing the bulk energy storage device at the output of the circuit eliminates the need for a separate PFC circuit. A capacitor and if present, an inductor provide additional output side filtering. FIG. 17 illustrates that the inductor, L2 2128, is also connected to the anode of diode, D1 2114, and a capacitor, C2 2126. The capacitor, C2 2126, is also connected to another inductor, L1, 2112, and the switch, Q1 2106. An optional resistor, R$_{LED}$ 2130 is shown in FIG. 21, which is connected to the first LED connection point 1524 and is in series with the LED array 2120. This optional resistor senses the LED current.

The switch, Q1 2106, is controlled by a control device 2108. The control device controls the switch to provide both PFC and a regulated current or voltage to the LED array, which is connected to the output of the circuit at LED connection points 2122, 2124. In this manner, only a single switch is required to provide both PFC and to control the current or voltage to the LED array. The control device 2108 controls the switch to provide PFC using any one of several known control methods. For example, the on-time of the switch may be proportional to the current provided to the LED array or inversely proportional to the line voltage. In circuits that use a Cuk topology, VLED and ILED are negative and need to be inverted by the control device. Although FIG. 17 illustrates the switch as a MOSFET, other types of switches may be used. The control device can be an analog circuit, an ASIC, a microprocessor or any other suitable control device.

If the circuit is providing regulated current to the LED array, then in some circuits the control device controls the on-time of the switch based on inputs, CT-1, CT-2, from an optional current sense device, such as a current sense transformer, CT 2116. In FIG. 17 the current sense device senses the current through the inductor, L1 2112. In other circuits, the control device controls the on-time of the switch based on inputs from an optional current sensing resistor $R_{Sense}$ 2110. In FIG. 17 where the switch, Q1 2110, is implemented with a MOSFET, the current sensing resistor is connected to the source of the MOSFET. If the circuit is providing approximately constant voltage to the LED array, then the control device controls the on-time of the switch based on voltage inputs which represent the voltage across the LED array, $V_{LED}$ to $V_{OutCom}$. Some circuits can include both types of inputs to the control device so that the circuit can be used with a variety of LED arrays, whereas other circuits may include only one type of input to the control device and be used with one type of LED arrays. The control device may also use the current $I_{Sense}$ sensed through the current sensing resistor, $R_{Sense}$ 2110, to control the switch on a cycle by cycle basis. If the current sensed through the current sensing resistor indicates an overcurrent condition, then the control device can immediately open the switch. As will be apparent to those skilled in the art, there are a number of other ways to control the switch to provide PFC.

The inductor, L1 2112, is connected to the switch, Q1 2106 and to C2 2126 on one side and to C1 2102 on the other side. The value of L1 2112 depends upon the type of control, as well as the frequency of operation and the power requirements of the LED array. For example, in one circuit that operates in a discontinuous conduction mode (DCM), the inductor, L1 1512, is relatively small with an exemplary value of 100 μH-1 MH. In another circuit that operates in a continuous conduction mode (CCM), the inductor, L1 2112, is larger with an exemplary value of 1 MH and above. In FIG. 21 where the switch Q1 2110 is implemented with a MOSFET, the inductor, L1 2112, is connected to the drain of the MOSFET. There may be a high frequency filter, C1 2102, at the input of the PFC/converter circuit. The high frequency filter may be a relatively small capacitor, C1 2102, typically less than 1 μF.

Figure 18:
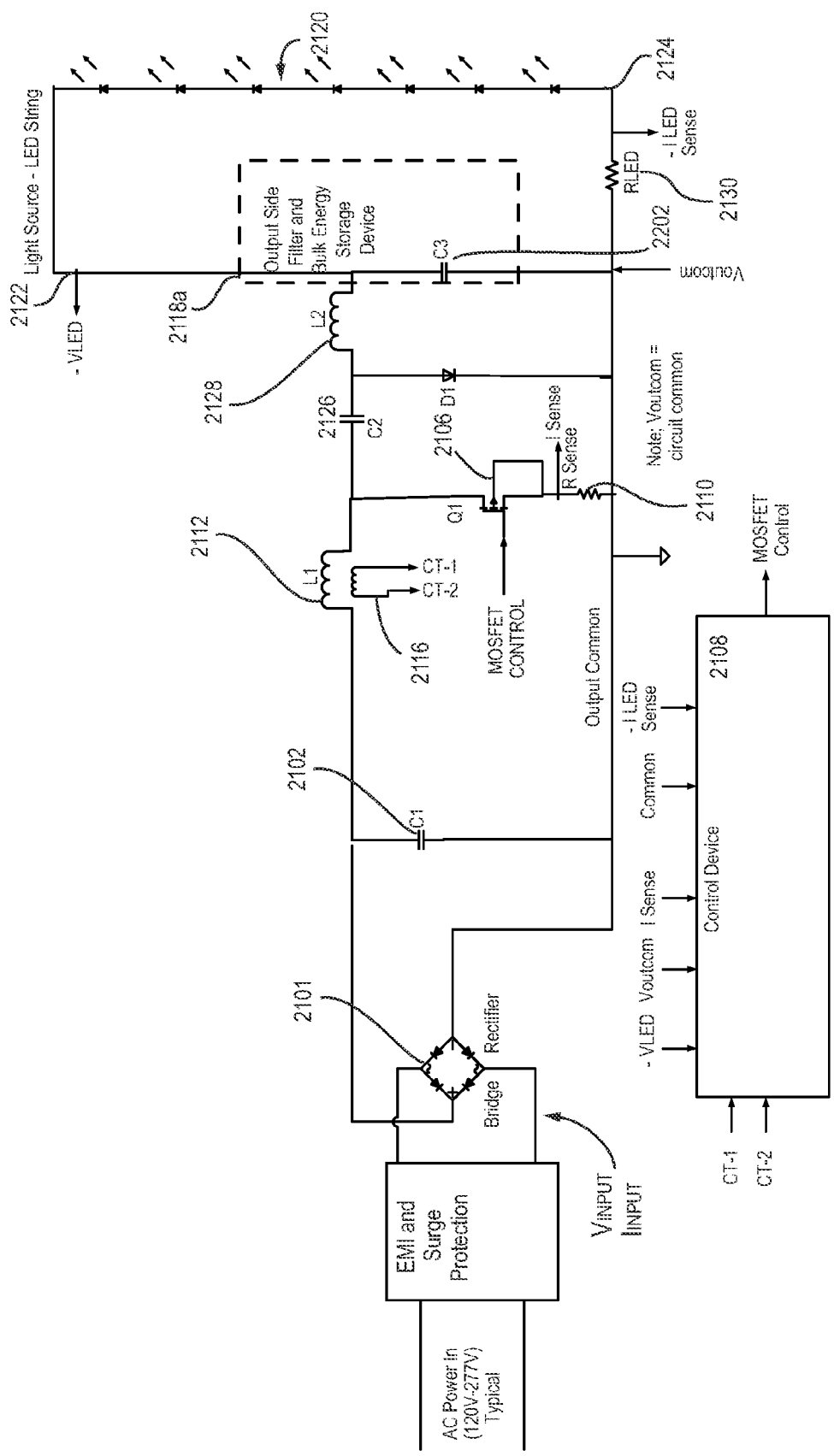
FIG. 18 is a circuit diagram of an exemplary portion of an LED driver circuit.

FIG. 18 illustrates an exemplary PFC/converter circuit based on a Cuk topology where the output side filter and energy storage device 2118*a* includes a capacitor, C3 2202, as the bulk energy storage device. In addition to bulk energy storage, the capacitor, C3 2202, also provides high and low frequency output side filtering. Exemplary values for C3 range from 300 to 400 μF. If the output side filter and energy storage device 2118*a* includes only a capacitor, such as C3 2202, then one side of the capacitor is connected to the LED connection point 2122 and the inductor L2 2128 and the other side of the capacitor is connected to the other LED connection point 2124.

The remaining components are similar to those described in connection with FIG. 17. A control device 2108 controls the switch, Q1 2106, to provide both PFC and an approximately constant current (or voltage) to the LED array 2120. The control of the switch is similar to that described above in connection with FIG. 21. FIG. 22 illustrates an optional current sense device 2116, which is used if the circuit is providing an approximately constant current to the LED array. There is a high frequency filter at the input, such as a small capacitor, C1 2102.

An inductor, L1 2112, is connected between the high frequency input filter, C1 2102, and the switch, Q1 2106, as well as to $C_{Cuk}$ 2126. The capacitor, $C_{Cuk}$ 2126, is connected on one side to the inductor, L1 2112, and the switch, Q1 2106, and on the other side to another inductor, $L_{Cuk}$ 2128, and the anode of the diode, D1 2114.

Figure 19:
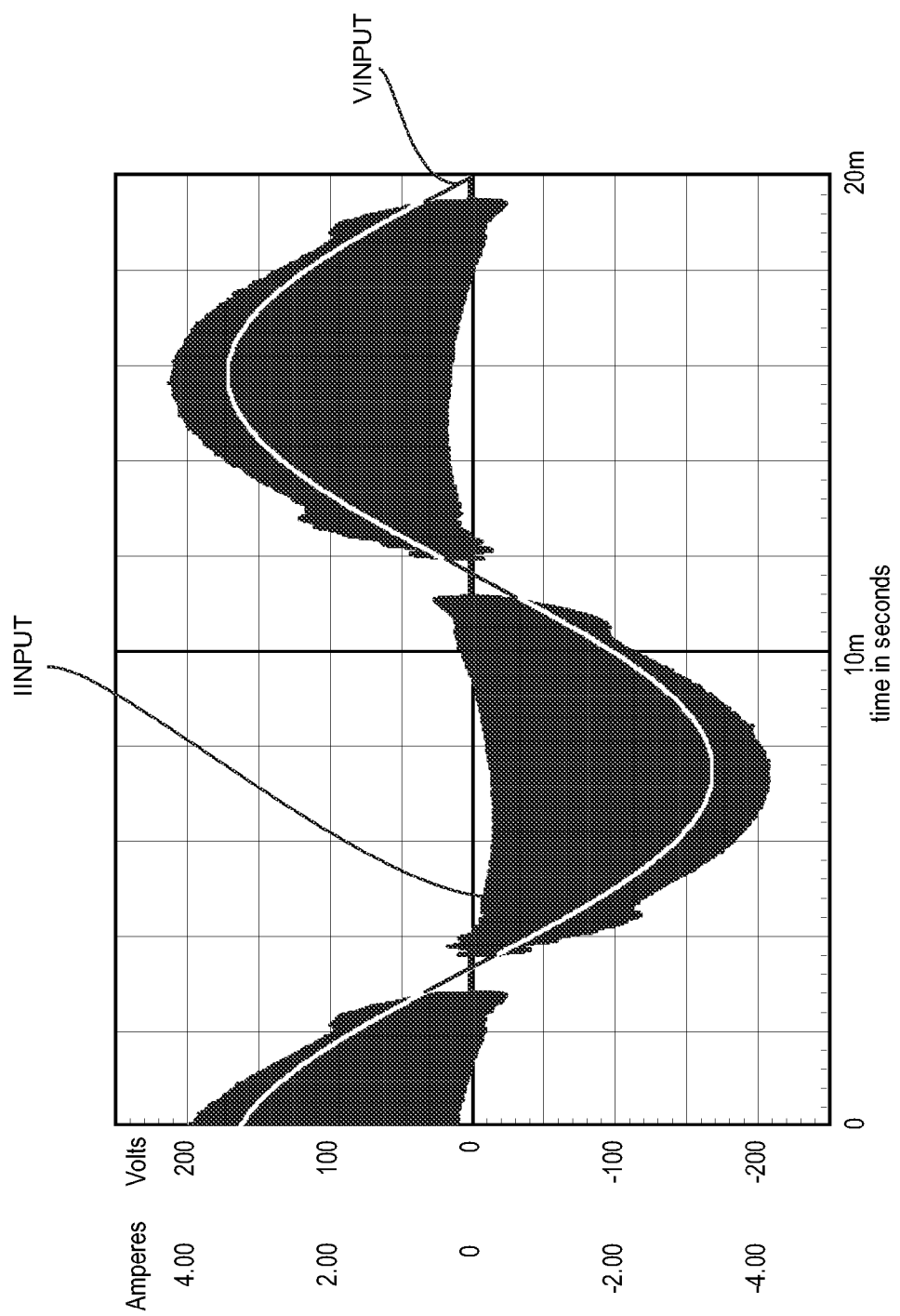
FIG. 19 is a graph illustrating voltage and current at a selected point in the circuit of FIG. 18.
Figure 20:
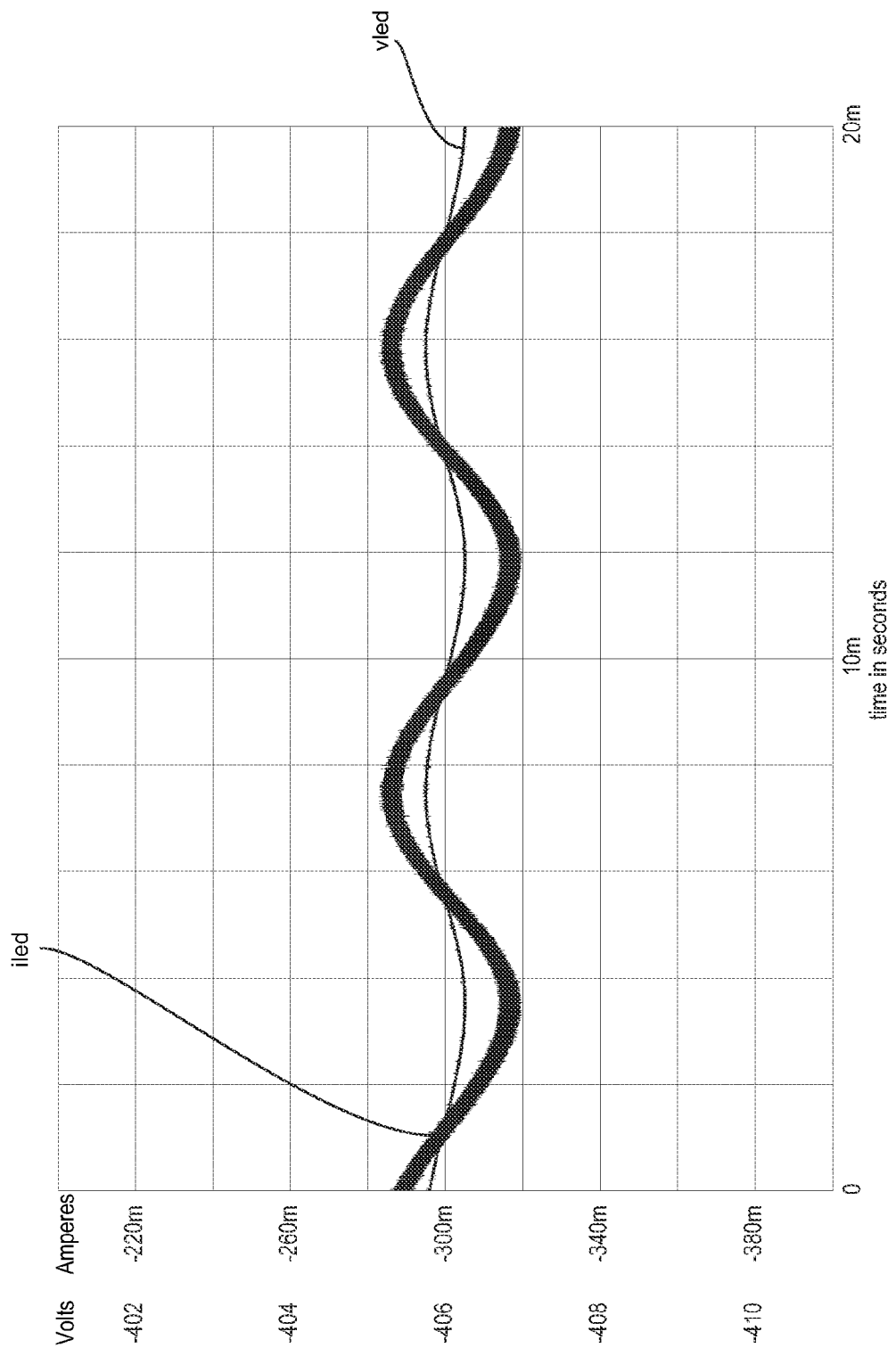
FIG. 20 is a graph illustrating voltage and current at the LED array for the circuit of FIG. 18.

FIGS. 19 and 20 illustrate the operation of a circuit, such as that illustrated in FIG. 18. FIG. 19 illustrates the change in voltage $V_{INPUT}$ and current $I_{INPUT}$ over time at a point between the EMI and surge protection block and the bridge rectifier. FIG. 20 illustrates the regulated current $I_{LED}$ and the regulated voltage $V_{LED}$ at the LED array. The values shown in FIGS. 19 and 20 are exemplary. As will be apparent to one skilled in the art, the values will vary for different implementations.

Although FIG. 18 illustrates a circuit where the output side filter and bulk energy storage device is a capacitor, similar to the buck-boost circuits described above, in other circuits the output side filter and bulk energy storage device may include both a capacitor and an inductor and the bulk energy storage may be provided by the inductor or a combination of a capacitor and an inductor.

FIG. 21 illustrates an example where the output side filter and bulk energy storage device includes both a capacitor, C3 2202, and an inductor, L3 2204. In one implementation, the capacitor, C3 2202, acts as the bulk energy storage device and provides output side filtering and the inductor, L3 2204, provides additional output side filtering. In a second implementation, both the capacitor, C3 2202, and the inductor, L3 2204, provide bulk energy storage, as well as output side filtering. In a third implementation, the inductor, L3 2204 provides bulk energy storage and output side filtering and the capacitor, C3 2202 provides additional output side filtering. In FIG. 21, the inductor, L3 2204 is connected to inductor L2 2128 and C3 2202 on one side and to the second LED connection point 2122 on the other side. The remaining components are similar to those described in connection with FIG. 18.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application to enable others skilled in the art to utilize the invention and various embodiments and with various modifications as are suited to the particular use contemplated. Alternative embodiments will become apparent to those skilled in the art to which the present invention pertains without departing from its spirit and scope. For example, although the embodiments described herein illustrate an LED array as the load, the circuit can be used with other types of loads that have similar power requirements.

I claim:

1. A drive circuit, comprising:
   a first load connection point and a second load connection point for connecting a load to an output of the drive circuit;
   an output side filter and bulk energy storage device, wherein a first connection point of the output side filter and bulk energy storage device is connected to the first load connection point, a second connection point of the output side filter and bulk energy storage device is connected to the second load connection point, and a third connection point of the output side filter and bulk energy storage device is connected to a cathode of a free wheeling diode;

a first inductor connected to an anode of the free wheeling diode and a switch and to the first load connection point and the first connection point of the output side filter and bulk energy storage device;

the free wheeling diode, wherein the cathode of the free wheeling diode is connected to the third connection point of the output side filter and bulk energy storage device and the anode of the free wheeling diode is connected to the first inductor and the switch;

the switch connected to the anode of the free wheeling diode and the first inductor and to a first drive circuit input; and a control device for controlling the switch to provide power factor correction, wherein the drive circuit provides both power factor correction and load regulation using the switch, wherein the drive circuit is operable for direct connection to an output of a bridge rectifier, wherein the first drive circuit input connects a first output terminal of the bridge rectifier to the switch and a second drive circuit input connects a second output terminal of the bridge rectifier to the first load connection point, the first connection point of the output side filter and bulk energy storage device, and the first inductor, wherein the output side filter and energy storage device includes a second inductor and a capacitor, wherein the second inductor is connected to the second load connection point and to the cathode of the free wheeling diode and the capacitor, and the capacitor is connected to the first load connection point and the first inductor and to the second inductor and the cathode of the free wheeling diode, and wherein the capacitor and/or the second inductor provide bulk energy storage by storing energy from one power line cycle to a next power line cycle and both the capacitor and the second inductor provide output side filtering.

2. The drive circuit of claim 1, further comprising:
a second capacitor, wherein the second capacitor is connected to the first load connection point and the first inductor and to the circuit input and wherein the first inductor is connected to the second capacitor and the first load connection point and to the switch and the anode of the free wheeling diode.

3. The drive circuit of claim 1, wherein the circuit provides a regulated current or a regulated voltage to an LED array connected to the first connection point and the second connection point.

4. An LED drive circuit, comprising:
a first LED connection point and a second LED connection point for connecting an LED array to an output of the drive circuit;
a first inductor connected to the first LED connection point and an output side filter and bulk energy storage device and to an anode of a free wheeling diode and a switch;
the output side filter and bulk energy storage device, wherein a first connection point of the output side filter and bulk energy storage device is connected to the first LED connection point and the first inductor, a second connection point of the output side filter and bulk energy storage device is connected to the second LED connection point, and a third connection point of the output side filter and bulk energy storage device is connected to a cathode of the free wheeling diode, wherein the output side filter and bulk energy storage device includes a second inductor that provides bulk energy storage by storing energy from one power line cycle to a next power line cycle and a capacitor, wherein the capacitor is connected to the first LED connection point and the first inductor and to the second inductor and the cathode of the free wheeling diode, and the second inductor is connected to the second LED connection point and to the capacitor and the cathode of the free wheeling diode, and wherein the second inductor and the capacitor provide output side filtering;

the free wheeling diode, wherein the cathode of the free wheeling diode is connected to the third connection point of the output side filter and bulk energy storage device and the anode of the free wheeling diode is connected to the first inductor and the switch;

the switch connected to the anode of the free wheeling diode and the first inductor and to a first drive circuit input; and a control device for controlling the switch to provide power factor correction;

wherein the circuit provides both power factor correction and load regulation using the switch, and wherein the drive circuit is operable for direct connection to an output of a bridge rectifier, wherein the first drive circuit input connects a first output terminal of the bridge rectifier to the switch and a second drive circuit input connects a second output terminal of the bridge rectifier to the first load connection point, the first connection point of the output side filter and bulk energy storage device, and the first inductor.

5. The LED drive circuit of claim 4, wherein the capacitor also provides bulk energy storage.

6. The LED drive circuit of claim 4, further comprising a second capacitor, wherein the second capacitor is connected to the first LED connection point, the output side filter and bulk energy storage device, and the first inductor and to the circuit input.

7. The LED drive circuit of claim 4, wherein the circuit provides a regulated current to the LED array connected to the first LED connection point and the second LED connection point.

8. The LED drive circuit of claim 4, wherein the circuit provides a regulated voltage to the LED array connected to the first LED connection point and the second LED connection point.

9. An LED drive circuit, comprising:
a first LED connection point and a second LED connection point for connecting an LED array to an output of the drive circuit;
an output side filter and bulk energy storage device, wherein a first connection point of the output side filter and bulk energy storage device is connected to the first LED connection point, a second connection point of the output side filter and bulk energy storage device is connected to the second LED connection point, and a third connection point of the output side filter and bulk energy storage device is connected to a cathode of a free wheeling diode, wherein the output side filter and bulk energy storage device includes a capacitor that provides bulk energy storage by storing energy from one power line cycle to a next power line cycle and output side filtering;
the free wheeling diode, wherein the cathode of the free wheeling diode is connected to the third connection point of the a second inductor, wherein the second inductor is connected to the second LED connection point and to the capacitor and the cathode of the free wheeling diode, and the capacitor is connected to the first LED connection point and the first inductor and to the second inductor and the cathode of the free wheeling diode, and wherein the capacitor and the second inductor provide output side filter and bulk energy storage device and an anode of the free wheeling diode is connected to a first inductor and a switch;

the first inductor connected to the anode of the free wheeling diode and the switch and to the first LED connection point and to the third connection point of the output side filter and bulk energy storage device;

the switch connected to the anode of the free wheeling diode and the first inductor and to a first drive circuit input; and a control device for controlling the switch to provide power factor correction;

wherein the drive circuit provides both power factor correction and load regulation using the switch, and wherein the drive circuit is operable for direct connection to an output of a bridge rectifier, wherein the first drive circuit input connects a first output terminal of the bridge rectifier to the switch and a second drive circuit input connects a second output terminal of the bridge rectifier to the first load connection point, the first connection point of the output side filter and bulk energy storage device, and the first inductor.

10. The LED drive circuit of claim 9, wherein the second inductor also provides bulk energy storage.

11. The LED drive circuit of claim 9 further comprising a second capacitor, wherein the second capacitor is connected to the first LED connection point, the output side filter and bulk energy storage device and the first inductor and to the circuit input.

12. The LED drive circuit of claim 9, wherein the circuit provides a regulated current to the LED array connected to the first LED connection point and the second LED connection point.

13. The LED drive circuit of claim 9, wherein the circuit provides a regulated voltage to the LED array connected to the first LED connection point and the second LED connection point.

* * * * *